(12) United States Patent
Shishido et al.

(10) Patent No.: US 8,498,992 B2
(45) Date of Patent: Jul. 30, 2013

(54) ITEM SELECTING APPARATUS AND METHOD, AND COMPUTER PROGRAM

(75) Inventors: Ichiro Shishido, Zushi (JP); Konosuke Matsushita, Kawasaki (JP)

(73) Assignee: JVC KENWOOD Corporation, Kanagawa (JP)

( * ) Notice: Subject to any disclaimer, the term of this patent is extended or adjusted under 35 U.S.C. 154(b) by 4 days.

(21) Appl. No.: 13/300,737

(22) Filed: Nov. 21, 2011

(65) Prior Publication Data

US 2012/0131018 A1    May 24, 2012

(30) Foreign Application Priority Data

Nov. 24, 2010  (JP) ................................. 2010-261812

(51) Int. Cl.
*G06F 17/30* (2006.01)
(52) U.S. Cl.
USPC ............ 707/748; 707/749; 707/751; 707/767
(58) Field of Classification Search
USPC ................... 707/748, 749, 751, 767
See application file for complete search history.

(56) References Cited

U.S. PATENT DOCUMENTS

| | | | | |
|---|---|---|---|---|
| 8,001,132 B2 * | 8/2011 | Koren et al. | ................... | 707/751 |
| 8,112,720 B2 * | 2/2012 | Curtis | ........................... | 715/811 |
| 2006/0041548 A1 * | 2/2006 | Parsons et al. | .................... | 707/5 |
| 2006/0100987 A1 * | 5/2006 | Leurs | ................ | 707/3 |
| 2008/0295132 A1 * | 11/2008 | Icho et al. | ...................... | 725/46 |
| 2009/0150340 A1 * | 6/2009 | Lhuillier et al. | ................. | 707/3 |
| 2010/0268661 A1 * | 10/2010 | Levy et al. | .................... | 705/347 |
| 2011/0035379 A1 * | 2/2011 | Chen et al. | .................... | 707/740 |
| 2011/0179021 A1 * | 7/2011 | Wen et al. | .................... | 707/723 |
| 2012/0072846 A1 * | 3/2012 | Curtis | ........................... | 715/738 |
| 2012/0102047 A1 * | 4/2012 | Bjork et al. | .................. | 707/748 |
| 2012/0143861 A1 * | 6/2012 | Sethi et al. | .................... | 707/731 |

FOREIGN PATENT DOCUMENTS

| | | |
|---|---|---|
| JP | 2001-202571 | 7/2001 |
| JP | 2001-236405 | 8/2001 |

* cited by examiner

*Primary Examiner* — Thanh-Ha Dang
(74) *Attorney, Agent, or Firm* — Louis Woo

(57) ABSTRACT

A favorite item set making section makes a favorite item set. A first rate calculating section calculates, with respect to a first set of items, a first rate of the number of items satisfying recommended item conditions to the number of all items. A user characteristic value calculating section calculates a user characteristic value by using the first rate. An item selecting section selects, from items in the favorite item set, a plurality of items including items satisfying the recommended item conditions to make a result item set. When the user characteristic value satisfies prescribed conditions, the rate of the number of items in the result item set which satisfy the recommended item conditions to the number of all items in the result item set is greater than the first rate and smaller than 1 except for a case where the first rate is 1.

19 Claims, 16 Drawing Sheets

| ITEM ID | ITEM ATTRIBUTE INFORMATION ||||| ITEM BODY |
|---|---|---|---|---|---|---|
| | TITLE | CREATOR | CATEGORY | DESCRIPTION INFORMATION | ITEM TIME INFO | |
| ItemID-1 | Tilte-1 | Creator-1 | Category-1 | Description-1 | 2010/8/1 | ... |
| ItemID-2 | Tilte-2 | Creator-2 | Category-2 | Description-2 | 2010/6/2 | ... |
| ... | ... | ... | ... | ... | ... | ... |

| USER ID | ITEM ID | RECOMM RANK |
|---|---|---|
| UserID-1 | ItemID-1000 | 1 |
| UserID-1 | ItemID-1020 | 2 |
| UserID-1 | ItemID-1035 | 3 |
| ... | ... | ... |
| UserID-1 | ItemID-2008 | N1 |
| UserID-2 | ItemID-1000 | 1 |
| UserID-2 | ItemID-2005 | 2 |
| ... | ... | ... |
| UserID-2 | ItemID-2000 | N2 |
| UserID-3 | ItemID-3000 | 1 |
| ... | ... | ... |

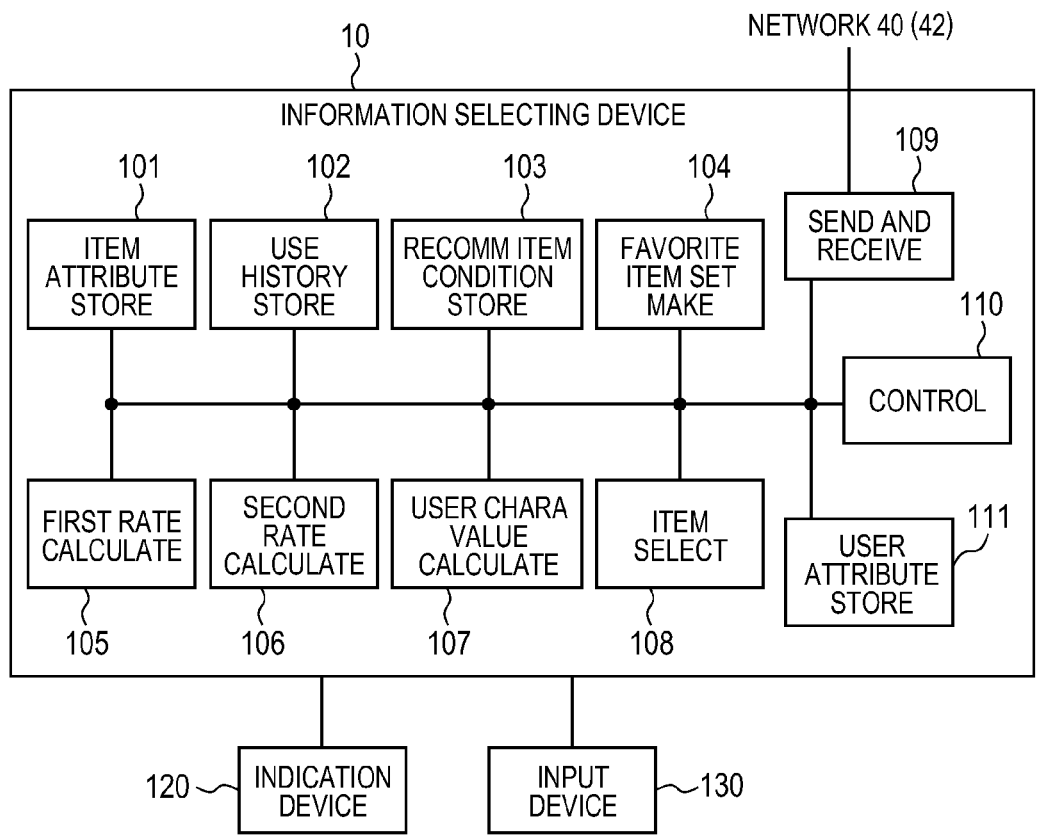

FIG. 8(a)

| USER ID | ITEM ID |
|---|---|
| UserID-1 | ItemID-3 |
| UserID-1 | ItemID-24 |
| UserID-3 | ItemID-30 |
| UserID-1 | ItemID-3 |
| UserID-3 | ItemID-3 |
| ... | ... |

FIG. 8(b)

| USER ID | ITEM ID | USE TIME INFORMATION |
|---|---|---|
| UserID-1 | ItemID-3 | 2010/1/1 10:15:20 |
| UserID-1 | ItemID-24 | 2010/1/2 15:20:30 |
| UserID-3 | ItemID-30 | 2010/1/3 13:05:40 |
| UserID-1 | ItemID-3 | 2010/1/5 16:30:40 |
| UserID-3 | ItemID-3 | 2010/1/7 20:00:30 |
| ... | ... | ... |

FIG. 8(c)

| USER ID | ITEM ID | NUMBER OF TIMES OF USE |
|---|---|---|
| UserID-1 | ItemID-3 | 3 |
| UserID-1 | ItemID-24 | 1 |
| UserID-3 | ItemID-30 | 8 |
| ... | ... | ... |

FIG. 9(a)

| ITEM ID |
|---|
| ItemID-3 |
| ItemID-20 |
| ItemID-30 |
| ... |

FIG. 9(b)

| COND TYPE | COND HEAD |
|---|---|
| 1 | ITEM ID |
| 2 | CREATOR |
| 3 | CATEGORY |
| 4 | KEYWORD |
| 5 | ITEM TIME INFORMATION |
| 6 | PRICE |
| 7 | RANK ABOUT NUMBER OF TIMES OF USE |
| 8 | NUMBER OF TIMES OF USE |

FIG. 9(c)

| COND TYPE | COND DATA |
|---|---|
| 1 | ItemID-3 |
| 1 | ItemID-10 |
| 2 | Creator-2 |
| 3 | Category-3 |
| 3 | Category-5 |
| 4 | EXCITING |
| 4 | DRAMATIC |
| 5 | 2010/4/1~2010/7/31 |
| 6 | 2,000 YEN~2,999 YEN |
| 7 | 1000~1999 |
| 8 | 200 TIMES~300 TIMES |

FIG. 9(d)

| ROW NUMBER | COMB LEVEL | LOGIC TYPE | NOT FLAG | COND TYPE | COND DATA |
|---|---|---|---|---|---|
| 1 | 1 |  |  | 2 | Creator-3 |
| 2 | 1 | ∪ |  | 2 | Creator-10 |
| 3 | 1 | ∪ |  | 3 | Category-5 |
| 4 | 2 | ∩ |  |  |  |
| 5 | 1 |  | ○ | 5 | ~2010/3/31 |
| 6 | 1 | ∩ |  | 7 | 1000~1999 |

FIG. 10

| USER ID | USER ATTRIBUTE INFORMATION |||||||||| 
|---|---|---|---|---|---|---|---|---|---|---|
| | NAME | SEX | BIRTHDAY | AREA | BLOOD TYPE | ENT TIME | HOBBY | FAVORITE CATEGORY 1 | FAVORITE CATEGORY 2 | FAVORITE KEYWORD |
| UID-1 | ×× | M | 1970/1/1 | TK | A | 2007/3 | BASEBALL | JAZZ | ROCK | ◇◇ |
| UID-2 | ○○ | F | 1976/3/9 | CH | — | 2009/4 | FLOWER ARRANGE | CLASSIC | J-POP | ◆◇ |
| UID-3 | △△ | F | 1964/10/10 | OS | O | 2008/9 | GOLF | ROCK | — | ■■ |
| ... | ... | ... | ... | ... | ... | ... | ... | ... | ... | ... |
| UID-Ug | ◆◆ | M | 1985/4/1 | NA | B | 2010/1 | MOVIE | TECHNO | — | — |

FIG. 11

| USER ID OF RECOMM TARGET USER | USER ID OF SIMILAR USER | SIMM DEGREE |
|---|---|---|
| UserID-1 | UserID-100 | 0.95 |
| UserID-1 | UserID-80 | 0.90 |
| ... | ... | ... |
| UserID-1 | UserID-105 | 0.60 |
| UserID-2 | UserID-105 | 0.85 |
| UserID-2 | UserID-70 | 0.82 |
| ... | ... | ... |
| UserID-2 | UserID-3 | 0.60 |
| UserID-3 | UserID-2 | 0.60 |
| UserID-4 | UserID-70 | 0.80 |
| ... | ... | ... |
| UserID-Us | ... | ... |

ITEM SELECTING APPARATUS AND METHOD, AND COMPUTER PROGRAM

BACKGROUND OF THE INVENTION

1. Field of the Invention

This invention relates to an apparatus, a method, and a computer program for selecting a recommended item or items suited to a user on the basis of information about the use of items by the user.

2. Description of the Related Art

In recent years, as digital technologies and network technologies have been advanced, there have been more cases where items such as digital contents and goods are distributed or sold by use of a network. Accordingly, there are increased needs for technologies of selecting an information piece or pieces about an item or items desired by a user from information pieces about many items, and providing the selected information piece or pieces to the user. A technology has been proposed which provides an information piece or pieces about an item or items accorded with user's taste and interest in response to information about the use of items by the user and information about the evaluation of the items by the user.

As disclosed in Japanese patent application publication numbers 2001-236405 and 2001-202571, a technology has been proposed which recommends items not only accorded with user's taste and interest but also a policy of a seller who sells the items.

Japanese application 2001-236405 discloses that a seller prepares recommendation rules for goods recommendation, and a recommendation rule fitted to a user is selected therefrom on the basis of information about goods purchased by the user and web pages accessed by the user in the past before items are recommended according to the selected recommendation rule. Thereby, items accorded with not only user's taste but also a sales policy of the seller can be recommended to the user.

Japanese application 2001-202571 discloses that information pieces about goods purchased by a customer in the past are accumulated, and campaign goods suited to the customer are selected from all campaign goods according to a goods strategy of a seller. Thereby, campaign goods corresponding to user's purchase history can be recommended to a user.

However, in the methods disclosed by Japanese applications 2001-236405 and 2001-202571, all goods recommended to users are limited to items accorded with a sales policy of a seller. Thus, recommendation information given to a user tends to be toward particular goods and particular fields, and is not always attractive to the user who receives the recommendation information.

In addition, since all the recommended goods are accorded with the sales policy of the seller, the user sometimes senses a common factor among the recommended goods and feels a high-pressure selling or aggressive peddling attitude of the seller. Thus, there is a conceivable case where users do not obediently accept recommended goods and have distrusts of a seller so that providing recommendation information does not result in an increase in sales of goods.

SUMMARY OF THE INVENTION

Accordingly, it is an object of this invention to provide item selecting apparatus, method, and computer program that enable the selection of items which are accorded with user's taste and seller's sales policy as much as possible, which are not biased toward seller's sales policy only, and which are easily acceptable by the user.

A first aspect of this invention provides an item selecting apparatus comprising a favorite item set making section selecting a first prescribed number of items in order of preference degree from the highest or items with preference degrees equal to or greater than a first prescribed value by using use histories for a target user, and making a favorite item set being a set of items decided to be accorded with the preference of the target user from the selected items; a first rate calculating section handling a set of some or all of the items in the favorite item set or a set of items related to use by the target user in the use histories as a first set of items, and calculating, with respect to the first set of items, a first rate of the number of items satisfying recommended item conditions representing conditions for judging as items to be recommended to the number of all items; a user characteristic value calculating section calculating a user characteristic value representing the strength of a relation between the preference of the target user and the recommended item conditions by using the first rate; and an item selecting section selecting, from items in the favorite item set, a plurality of items including items satisfying the recommended item conditions to make a result item set; wherein the item selecting section makes the result item set so that when the user characteristic value satisfies prescribed user characteristic value conditions, the rate of the number of items in the result item set which satisfy the recommended item conditions to the number of all items in the result item set will be greater than the first rate and smaller than 1 except for a case where the first rate is 1.

A second aspect of this invention is based on the first aspect thereof, and provides an item selecting apparatus wherein when the user characteristic value does not satisfy the prescribed user characteristic value conditions, the item selecting section makes the result item set so that the rate of items in the result item set which satisfy the recommended item conditions to the number of all items in the result item set will be the first rate.

A third aspect of this invention is based on the first aspect thereof, and provides an item selecting apparatus further comprising a second rate calculating section making a second set of items including items except the items in the first set, and calculating a second rate of the number of items in the second set which satisfy the recommended item conditions to the number of all items in the second set, wherein the user characteristic value calculating section calculates the user characteristic value for the target user by using the first rate and the second rate.

A fourth aspect of this invention is based on the third aspect thereof, and provides an item selecting apparatus wherein the second rate calculating section calculates preference degrees about respective items for a user or users except the target user by using the use histories, and selects a second prescribed number of items in order of calculated preference degree from the highest or selects items corresponding to calculated preference degrees equal to or greater than a second prescribed value to make the second set.

A fifth aspect of this invention is based on the third aspect thereof, and provides an item selecting apparatus wherein the second rate calculating section calculates preference degrees about respective items for the target user by using the use histories, and selects items in ranks later than that corresponding to the first prescribe number if the items are sorted in order of calculated preference degree from the highest or selects items corresponding to calculated preference degrees less than the first prescribed value, and thereby makes the second set.

A sixth aspect of this invention is based on the third aspect thereof, and provides an item selecting apparatus wherein the second rate calculating section selects items related to use by users except the target user by using the use histories to make the second set.

A seventh aspect of this invention is based on the third aspect thereof, and provides an item selecting apparatus wherein the user characteristic value calculating section calculates the user characteristic value by using a value resulting from subtracting the second rate from the first rate or a value resulting from dividing the first rate by the second rate.

An eighth aspect of this invention is based on the first aspect thereof, and provides an item selecting apparatus wherein the item selecting section makes the result item set by using both items satisfying the recommended item conditions in the favorite item set, and items not satisfying the recommended item conditions in the favorite item set.

A ninth aspect of this invention is based on the first aspect thereof, and provides an item selecting apparatus wherein in cases where the user characteristic value satisfies the prescribed user characteristic value conditions, the item selecting section makes the result item set so that the rate of the number of items in the result item set which satisfy the recommended item conditions to the number of all items in the result item set will be greater than the first rate and smaller than 1 except a case where the first rate is 1, and will increase as the first rate increases.

A tenth aspect of this invention is based on the first aspect thereof, and provides an item selecting apparatus wherein the prescribed user characteristic value conditions are conditions that the user characteristic value is between a third prescribed value and a fourth prescribed value greater than the third prescribed value, and wherein when the user characteristic value conditions are satisfied, the item selecting section makes the result item set so that the rate of the number of items in the result item set which satisfy the recommended item conditions to the number of all items in the result item set will be greater than the first rate and smaller than 1 except a case where the first rate is 1, and wherein when the user characteristic value is greater than the fourth prescribed value, the item selecting section makes the result item set so that the rate of the number of items in the result item set which satisfy the recommended item conditions to the number of all items in the result item set will be smaller than the first rate.

An eleventh aspect of this invention is based on the first aspect thereof, and provides an item selecting apparatus wherein a range in ranks of items in the use histories about the number of times of item use or a range in ranks of items in the use histories about the number of users who have used an item is set in the recommended item conditions.

A twelfth aspect of this invention is based on the first aspect thereof, and provides an item selecting apparatus wherein a range in numbers of times of use of items in the use histories or a range in numbers of users who have used items in the use histories is set in the recommended item conditions.

A thirteenth aspect of this invention is based on the first aspect thereof, and provides an item selecting apparatus further comprising an output section outputting the result item set via a network.

A fourteenth aspect of this invention provides a method of selecting items in an information processing apparatus. The method comprises a favorite item set making step of selecting a first prescribed number of items in order of preference degree from the highest or items with preference degrees equal to or greater than a first prescribed value by using use histories for a target user, and making a favorite item set being a set of items decided to be accorded with the preference of the target user from the selected items; a first rate calculating step of handling a set of some or all of the items in the favorite item set or a set of items related to use by the target user in the use histories as a first set of items, and calculating, with respect to the first set of items, a first rate of the number of items satisfying recommended item conditions representing conditions for judging as items to be recommended to the number of all items; a user characteristic value calculating step of calculating a user characteristic value representing the strength of a relation between the preference of the target user and the recommended item conditions by using the first rate; and an item selecting step of selecting, from items in the favorite item set, a plurality of items including items satisfying the recommended item conditions to make a result item set; wherein the item selecting step makes the result item set so that when the user characteristic value satisfies prescribed user characteristic value conditions, the rate of the number of items in the result item set which satisfy the recommended item conditions to the number of all items in the result item set will be greater than the first rate and smaller than 1 except for a case where the first rate is 1.

A fifteenth aspect of this invention is based on the fourteenth aspect thereof, and provides a method wherein when the user characteristic value does not satisfy the prescribed user characteristic value conditions, the item selecting step makes the result item set so that the rate of the number of items in the result item set which satisfy the recommended item conditions to the number of all items in the result item set will be the first rate.

A sixteenth aspect of this invention is based on the fourteenth aspect thereof, and provides a method further comprising a second rate calculating step of making a second set being a set of items including items except the items in the first set, the second rate calculating step calculating, with respect to the second set, a second rate of the number of items satisfying the recommended item conditions to the number of all items, wherein the user characteristic value calculating step calculates the user characteristic value for the target user by using the first rate and the second rate.

A seventeenth aspect of this invention provides a computer program enabling an information processing apparatus to function as a favorite item set making section selecting a first prescribed number of items in order of preference degree from the highest or items with preference degrees equal to or greater than a first prescribed value by using use histories for a target user, and making a favorite item set being a set of items decided to be accorded with the preference of the target user from the selected items; a first rate calculating section handling a set of some or all of the items in the favorite item set or a set of items related to use by the target user in the use histories as a first set of items, and calculating, with respect to the first set of items, a first rate of the number of items satisfying recommended item conditions representing conditions for judging as items to be recommended to the number of all items; a user characteristic value calculating section calculating a user characteristic value representing the strength of a relation between the preference of the target user and the recommended item conditions by using the first rate; and an item selecting section selecting, from items in the favorite item set, a plurality of items including items satisfying the recommended item conditions to make a result item set; wherein the item selecting section makes the result item set so that when the user characteristic value satisfies prescribed user characteristic value conditions, the rate of the number of items in the result item set which satisfy the recommended item conditions to the number of all items in the result item set will be greater than the first rate and smaller than 1 except for a case where the first rate is 1.

An eighteenth aspect of this invention is based on the seventeenth aspect thereof, and provides a computer program wherein when the user characteristic value does not satisfy the prescribed user characteristic value conditions, the item selecting section makes the result item set so that the rate of the number of items in the result item set which satisfy the recommended item conditions to the number of all items in the result item set will be the first rate.

A nineteenth aspect of this invention is based on the seventeenth aspect thereof, and provides a computer program enabling the information processing apparatus to further function as a second rate calculating section making a second set being a set of items including items except the items in the first set, the second rate calculating section calculating, with respect to the second set, a second rate of the number of items satisfying the recommended item conditions to the number of all items, wherein the user characteristic value calculating section calculates the user characteristic value for the target user by using the first rate and the second rate.

This invention has the following advantage. It is possible to select items accorded with the preference (taste) of a user and the sales policy of a seller as much as possible and not biased toward the sales policy only, and easily acceptable by the user.

BRIEF DESCRIPTION OF THE DRAWINGS

FIG. 6 is a block diagram showing the structure of an information selecting device.

FIG. 7 is a diagram showing an example of the store format for an item attribute store section.

FIGS. 8(a)-8(c) are diagrams showing examples of the store format for a use history store section.

FIGS. 9(a)-9(d) are diagrams showing examples of the store format for a recommended item condition store section.

FIG. 10 is a diagram showing an example of the store format for a user attribute store section.

FIG. 11 is a diagram showing a table in which the user IDs of recommendation target users, the user IDs of selected similar users, and the degrees of similarity therebetween are related with each other.

DETAILED DESCRIPTION OF THE INVENTION

Structure and operation of a network system in an embodiment of this invention will be sequentially described with reference to drawings.

Figure 1:
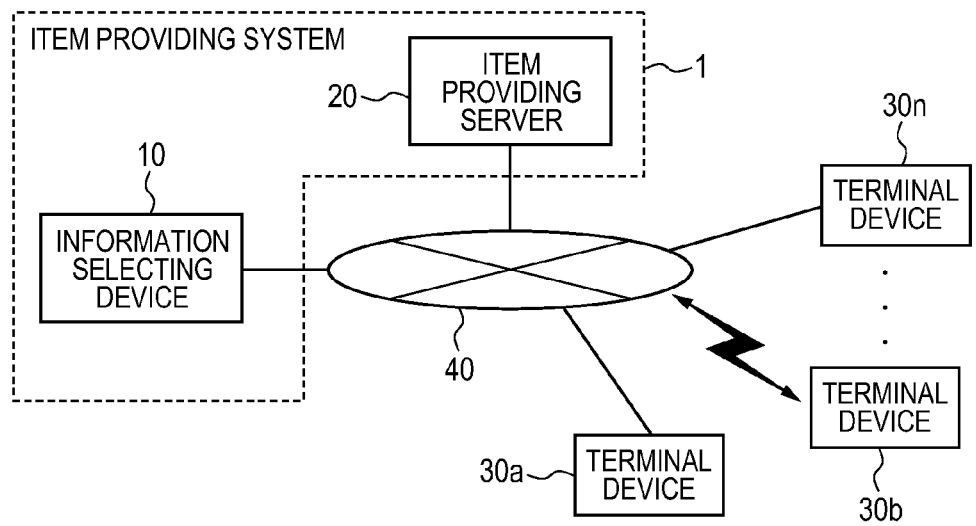
FIG. 1 is a block diagram showing the structure of the whole of a system according to an embodiment of this invention.

FIG. 1 is a block diagram of the whole of the network system in the embodiment of this invention. As shown in FIG. 1, the network system is designed so that an information selecting device 10, an item providing server 20, and one or more terminal devices 30 (30a, 30b, . . . 30n in the drawing) are connected by a network 40. The information selecting device 10 operates to select an information piece or pieces about, for example, an item or items. The information selecting device 10 and the item providing server 20 form an item providing system 1 doing service such as item providing service for a user using a terminal device 30. The network 40 may be a wide area network such as the internet. The connection between the terminal devices 30 and the network 40 is on a wired basis or a wireless basis.

Figure 2:
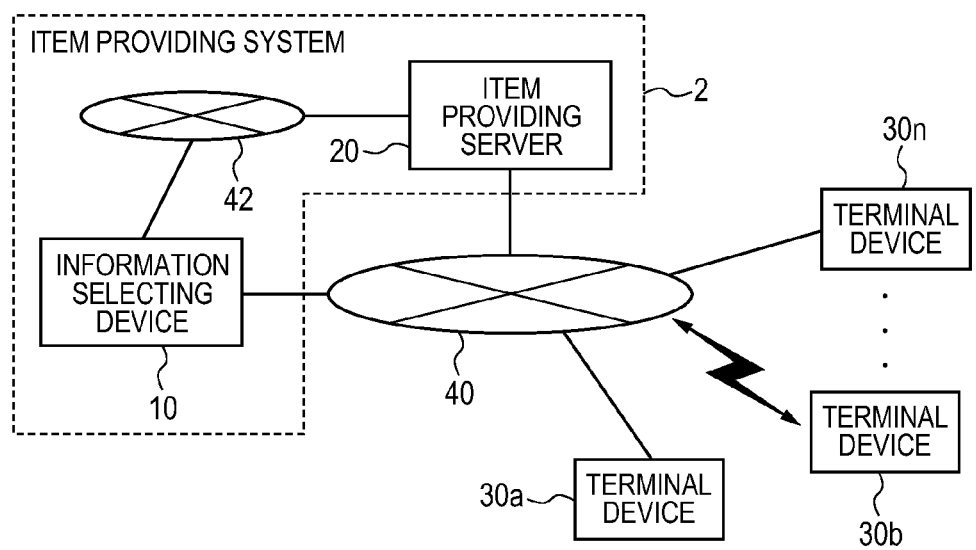
FIG. 2 is a block diagram showing another structure of the system.

FIG. 2 shows a network system which may replace that in FIG. 1. In the network system of FIG. 2, an item providing server 20 and one or more terminal devices 30 (30a, 30b, . . . 30n) are connected to a network 40, and an information selecting device 10 is connected to the item providing server 20 via a network 42 separate from the network 40. In this case, the information selecting device 10 and the item providing server 20 that are connected by the network 42 form an item providing system 2. The network 42 may be, for example, LAN (local area network). In view of maintaining security, it is preferable to limit a direct access to the information selecting device 10 from each of the terminal devices 30.

The network system may have one of various structures not limited to those in FIGS. 1 and 2. For example, the information selecting device 10 and the item providing server 20 may be formed by a common device. Each of the information selecting device 10 and the item providing server 20 may be formed by a plurality of devices.

A description will be made below as to an exemplary case where the network system has the structure in FIG. 1.

The item providing server 20 is a device which provides items and information pieces about the items in response to a request from each of the terminal devices 30. The items are various goods, services, or digital contents of, for example, text, audio, music, or video. The items may be information pieces about persons, real estates, or financial goods. The items may be material or immaterial. The items may be toll ones or toll-free ones.

Figures 3, 4, 5:
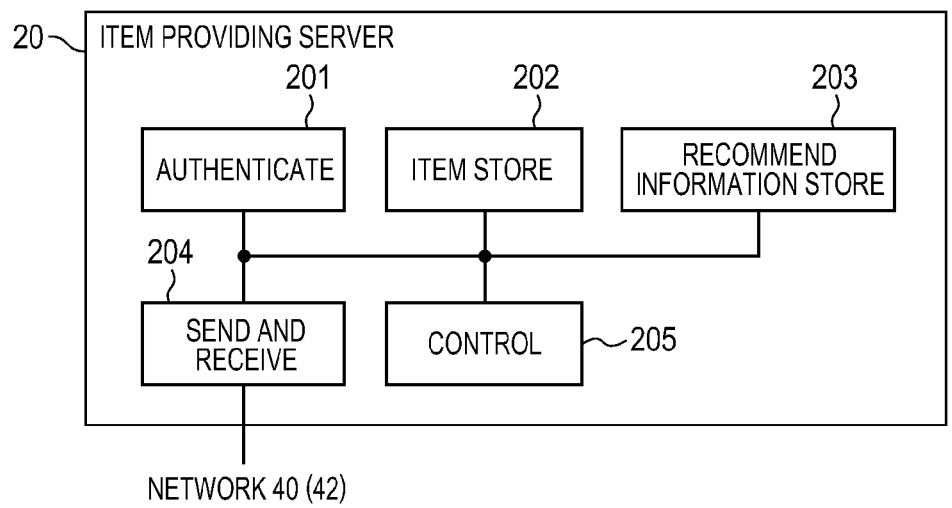
FIG. 3 is a block diagram showing the structure of an item providing server.
FIG. 4 is a diagram showing an example of the store format for an item store section.
FIG. 5 is a diagram showing an example of the store format for a recommendation information store section.

FIG. 3 is a block diagram showing the structure of the item providing server 20. As shown in FIG. 3, the item providing server 20 includes an authentication section 201, an item store section 202, a recommendation information store section 203, a sending and receiving section 204, and a control section 205. The item providing server 20 may be formed by a general computer including a CPU, a RAM, a ROM, an HDD (hard disk drive), a network interface, and others. The general computer executes a program for performing below-mentioned processes, and thereby serves as the item providing server 20. The program is stored in, for example, the ROM or the HDD.

The authentication section 201 implements a process of authenticating a user who uses one of the terminal devices 30. The authentication section 201 stores user IDs for identifying users who use the terminal devices 30 or terminal device IDs for identifying the terminal devices 30 and passwords in a manner such as to relate them with each other. Each of these information pieces (the user IDs or the terminal device IDs and the passwords) is obtained and set by the implementation of a user registration process at the time of first use by a user, and these information pieces are stored in a memory area within the authentication section 201.

In the present embodiment of this invention, users are identified through the use of user IDs. In the case where cellular phones are used as the terminal devices 30, the terminal device IDs which can be obtained at the time of connection with the terminal devices 30 may be used instead of the user IDs. The user IDs and the terminal device IDs are called use subject IDs. The authentication section 201 may be omitted. Only the use subject IDs may be stored in the authentication section 201, and storing the passwords therein and the authentication process may be omitted. For example, in the case where IDs which can not be easily altered such as terminal device IDs set at the time of the manufacture of the terminal devices 30 are used as the use subject IDs, storing the passwords in the authentication section 201 and the authentication process can be omitted.

The item store section 202 stores information pieces about items provided by the item providing server 20. The item store section 202 stores the information pieces about the items in a table format such as shown in FIG. 4.

As shown in FIG. 4, the item store section 202 stores item IDs, item attribute information pieces, and item bodies in a manner such as to relate them with each other. The item IDs are for identifying items respectively. The item attribute information pieces represent the "titles", "creators", and "categories" of the items, and include "description information" pieces and "item time" information pieces about the items.

The "creators" have meanings in a wide range depending on item types. The creators are, for example, performers, players, lyric writers, composers, writers, producers, directors, or manufactures of the items.

The "categories" are those used in classifying the items according to prescribed references. For example, in the case where the items are music pieces, the "categories" are genres such as "rock", "jazz", "classic", and "folk". In the case where the items are movies, the "categories" are genres such as "SF", "action", "comedy", and "animation". The "categories" may be countries or areas of creators such as "Japan", "USA", "UK", and others. The "categories" may relate to atmospheres and moods of the items, and may be "healing", "exciting", "dramatic", and others. The "description information" pieces represent the outlines or summaries of the items or the descriptions of the background of making the items.

The "item time information" pieces represent the times (moments) at which the items were made. The "item time information" pieces may represent the times at which the items were registered in the item providing server 20 or the times at which providing the items were started. In the present embodiment of this invention, the dates such as "Jan. 1, 2010" are used as the unit for the times. Another unit may be used. For example, the dates and times such as those up to second unit such as "Jan. 1, 2010, 10-hour 15-minute 20-second" may be used. The dates and times such as those up to millisecond unit may be used. The dates up to month unit such as "January in 2010" may be used. The dates up to quarter unit such as "2010, 1Q" may be used. The dates in year unit such as "2010" may be used. The dates in unit greater than year unit such as "during 10 years from 2000" may be used.

Regarding the item attribute information pieces in the item store section 202, a plurality of attribute heads (headlines) of the same type may be assigned to one item. For example, one item may be assigned three different categories. The item attribute information pieces mentioned here are mere examples, and should not be limited to the above-mentioned ones. Attribute heads such as "price" and "size" may be used.

Each of the item bodies can be text data or binary data forming the related item itself or an information piece representing the position where the related item exists (for example, URL: Uniform Resource Locator). The item bodies are stored regarding items that are, for example, digital contents which can be distributed to the terminal devices 30 via the network 40. Storing the item bodies may be omitted in the case where the related items are, for example, goods or services.

The recommendation information store section 203 stores recommendation information pieces received from the information selecting device 10. Each recommendation information piece represents an item or items recommended to each user.

The recommendation information store section 203 can store recommendation information pieces in a format such as shown in FIG. 5. With reference to FIG. 5, the recommendation information store section 203 stores user IDs, item IDs, and recommendation ranks in a manner such as to relate them with each other.

The recommendation ranks are order numbers about recommending items for each user ID. As the recommendation rank is smaller, the related item is presented to a user with higher priority. Recommendation degrees may be stored in place of the recommendation ranks. As the recommendation degree is greater, the related item is presented to a user with higher priority. Storing the recommendation ranks may be omitted. In this case, the recommendation information pieces in the recommendation information store section 203 are handled with the same recommendation rank.

The sending and receiving section 204 performs a process of sending and receiving data to and from the information selecting section 10 and the terminal devices 30 via the network 40 (further via the network 42 in the case of the structure in FIG. 2). The control section 205 performs the control of the whole of the item providing server 20.

Each of the terminal devices 30 can be used by a user, and may be formed by a general computer including a CPU, a RAM, a ROM, an HDD (hard disk drive), a network interface, and others. A program for obtaining item information pieces from the item providing server 20 is installed in each of the terminal devices 30. A representative example of this program is a web browser. Each of the terminal devices 30 may be formed by a portable terminal device or a cellular phone having, for example, a browser function.

In the case where a computer is used as each of the terminal devices 30, an indication device such as a display and an input device (not shown) for receiving operation commands from a user are connected thereto. Examples of the input device are a remote control device, a track ball, a mouse, and a keyboard. In the case where a cellular phone is used as each of the terminal devices 30, an indication device and an input device are contained therein. For convenience, a description will be made below as to cases where an indication device and an input device are connected to each of the terminal devices 30.

FIG. 6 is a block diagram showing the structure of the information selecting device 10 which serves as an item selecting device. The information selecting device 10 serves to select an item or items recommended to each user. As shown in FIG. 6, the information selecting device 10 includes an item attribute store section 101, a use history store section 102, a recommended item condition store section 103, a favorite item set making section 104, a first rate calculating section 105, a second rate calculating section 106, a user characteristic value calculating section 107, an item selecting section 108, a sending and receiving section 109, a control section 110, and a user attribute store section 111. An indication device 120 and an input device 130 are connected to the information selecting device 10. The indication device 120 serves to indicate information necessary for a manager about the information selecting device 10. The input device 130 is, for example, a keyboard or a mouse operated by the manager.

The information selecting device 10 may be formed by a general computer including a CPU, a RAM, a ROM, an HDD (hard disk drive), a network interface, and others. The general computer executes a program of implementing processes as mentioned later, and thereby functions as the information selecting device 10.

The information selecting device 10 may be formed by a plurality of computers. For example, to disperse load, computers are assigned to one processing block of the information selecting device 10 and thereby dispersedly processing is implemented. According to another example, one processing block of the information selecting device 10 is implemented by one computer while another processing block thereof is implemented by another computer, so that dispersedly processing can be carried out.

The item attribute store section 101 uses a data store format shown in FIG. 7. With reference to FIG. 7, the item attribute store section 101 stores item IDs and item attribute information pieces in a manner such as to relate them with each other. The item IDs and the item attribute information pieces are the same as those in the item store section 202 of the item providing server 20 which are shown in FIG. 4. The item attribute store section 101 differs from the item store section 202 in that item bodies are absent. Although the information selecting device 10 does not need item bodies, data in the item store section 202 may be used as it is before being stored. Alternatively, the item attribute store section 101 may be omitted by designing the information selecting device 10 to be capable of directly referring to data in the item store section 202.

As previously mentioned, the item attribute information pieces represent the "titles", "creators", and "categories" of the items, and include "description information" pieces and "item time information" pieces about the items. As will be mentioned later, in the case where the recommended item condition store section 103 stores only recommended item conditions having no relation with the item attribute information pieces, the item attribute store section 101 may be omitted.

The control section 110 performs various processes for controlling the whole of the information selecting device 10. For example, the control section 110 stores use histories in the use history store section 102. The use histories in the use history store section 102 are of a table format such as shown in FIG. 8(a), 8(b), or 8(c). The use histories indicate correspondences between the item IDs of items designated by users and the user IDs contained in use request messages sent from the item providing server 20.

The use history store section 102 uses, for example, one of various store forms shown in FIGS. 8(a), 8(b), and 8(c). FIG. 8(a) shows a store form designed so that user IDs and item IDs are stored while being related with each other. One use request message corresponds to one row in the table of FIG. 8(a). With reference to FIG. 8(a), both the first row and the fourth row in the table indicate a combination of "UserID-1" and "ItemID-3". As understood from this fact, table row data is added and stored for each use request message even in the case where a same combination of a user ID and an item ID recurs. Thus, the number of times of use of each item identified by an item ID, and the number of users who have used each item, that is, the number of user IDs related to each item can be easily counted by another processing section. In the case where one use request message contains a plurality of item IDs, different table rows are assigned to these item IDs respectively and they are stored.

FIG. 8(b) shows a store form designed so that user IDs, item IDs, and use time information pieces are stored while being related with each other. Similar to the form of FIG. 8(a), one use request message corresponds to one row in the table of FIG. 8(b). In the case where a use request message contains a use time information piece, the use time information piece is extracted therefrom before being stored. In the case where a use request message does not contain a use time information piece, the time of the reception of the use request message by the information selecting device 10 is detected by using a clock in the control section 110 and the detected time is stored as a use time information piece.

The format of the use time information pieces uses day and time units up to second unit such as "Jan. 1, 2010, 10-hour 15-minute 20-second". The dates and times such as those up to millisecond unit may be used. The dates such as those up to day unit may be used. The dates up to month unit may be used. The dates in year unit may be used. Other day and time formats may be used. The value of evaluation of an item by a user (the numerical value indicative of the degree at which the user likes or dislikes the item: for example, like=3, neither like nor dislike=2, dislike=1) may be contained in a use request message, and the user ID, the item ID, the use time information piece, and the evaluation value may be stored in the use history store section 102 while being related with each other.

The use history store section 102 may use a store format designed so that as shown in FIG. 8(c), use time information pieces are omitted and user IDs, item IDs, and the numbers of times of use are related with each other. In the case where the favorite item set making section 104 does not utilize use time information pieces as mentioned later, the storing is implemented with the format of FIG. 8(c) and thereby the necessary memory capacity can be reduced. In the case where a use request message contains the value of evaluation of an item by a user, a user ID, an item ID, the number of times of use, and the evaluation value may be stored in the use history store section 102 while being related with each other.

The recommended item condition store section 103 is a memory area for storing recommended item condition data representing conditions of items (recommended item conditions) which an item seller desires to recommend to users. Among items selected by another processing block, an item or items which satisfy conditions registered as recommended item conditions are decided to be an item or items accorded with the recommended item conditions.

The seller can freely set the recommended item conditions depending on item stock conditions, a stocking price, a sales policy, and others. A manager of the item providing server 20 entrusts a manager of the information selecting device 10 with the inputting of the recommended item condition data. Alternatively, the manager of the item providing server 20 may register the recommended item condition data in the item providing server 20 before sending the registered data to the information selecting device 10.

The recommended item condition store section 103 can store the recommended item condition data in the form of a table such as shown in FIG. 9(*a*). The table of FIG. 9(*a*) corresponds to the simplest store format, and the item IDs of items designated by the manager of the information selecting device 10 are stored through the use of the input device 130.

The recommended item condition store section 103 may store the recommended item condition data in the form of a table such as shown in FIG. 9(*c*) by using rules such as shown in FIG. 9(*b*) for making condition types and condition heads correspond to each other.

As shown in FIG. 9(*b*), the condition type "1" indicates that the condition data is an item ID. The condition type "2" indicates that the condition data is a "creator". In this case, the name of the creator or the creator ID is registered in the condition data. The condition type "3" indicates that the condition data is a "category". In this case, the category name or the category ID is registered in the condition data. The condition type "4" indicates that the condition data is a "keyword". In this case, when the keyword is contained in attribute heads such as a "title", a "creator", a "category", and a "description information" piece in item attribute, it is decided that there is an accordance with the recommended item conditions. The condition type "5" indicates that the condition data is an "item time information" piece. As in the example of FIG. 9(*c*), the range defined by two "item time information" pieces may be stored. Alternatively, a single "item time information" piece may be stored. The condition type "6" indicates that the condition data is a "price". As in the example of FIG. 9(*c*), the range between "prices" may be stored. Alternatively, a single "price" may be stored.

The condition type "7" represents a rank or a rank range regarding the number of times of use of a related item. The example of FIG. 9(*c*) shows that an item having a rank in the range between a rank of 1000 and a rank of 1999 measured from the greatest number of times of use is a target. In this case, when 3000 items are contained in the use histories in the use history store section 102, items medium in popularity are designated. In the case where data of the condition type "7" is stored in the recommended item condition store section 103, the control section 110 reads out use histories from the use history store section 102, and counts the number of times of use for each of item IDs contained in the read-out use histories. Then, the control section 110 sorts the counted numbers in order from the greatest before storing an item ID or IDs corresponding to a designated rank or a designated rank range in a memory area in the recommended item condition store section 103. In this process, the number of times of use may be counted for only each of use histories satisfying prescribed conditions, for example, conditions where use time information pieces are in a prescribed range. For each of the items, the number of users (the number of user IDs) who made use may be counted instead of the number of times of use. In this case, the items are ranked in order from the greatest number of users who made use, and a rank or a rank range is used as the recommended item condition data.

The condition type "8" represents the number of times of use of a related item. The example of FIG. 9(*c*) shows that an item corresponding to the number of times of use in the range between 200 and 300 is a target. The control section 110 reads out use histories from the use history store section 102, and counts the number of times of use for each of item IDs contained in the read-out use histories before storing an item ID or IDs corresponding to a designated number or numbers of times in a memory area in the recommended item condition store section 103. Similar to the case of the condition type "7", the number of users (the number of user IDs) who made use may be used instead of the number of times of use. In this case, with respect to the use histories in the use history store section 102, the number of users (the number of user IDs) who made use is counted for each item, and a counted number of users or a counted user number range is used as the recommended item condition data.

In the case where the condition types "2" to "6" are used, the item attribute store section 101 is necessary. In the case where the condition types "1", "7", and "8" are used, the item attribute store section 101 can be omitted.

By using the format of FIG. 9(*c*), various recommended item condition data pieces can be freely registered and stored. In the case where a plurality of rows (a plurality of rules) are registered in a table, it is good that an item corresponding to one or more rows is decided to be accorded with the recommended item conditions. This case corresponds to the fact that rows are combined by logical disjunction (OR) and the process is done. Rows of the same condition type may be combined by logical disjunction (OR) and rows of different condition types may be combined by logical product (AND), and the process may be done.

For example, taking out the first to third rows from the table of FIG. 9(*c*) results in the conditions ("ItemID-3"∪"ItemID-10")∩"Creator-2" where "∩" denotes logical product (AND) and "∪" denotes logical disjunction (OR).

By using the store format of FIG. 9(*c*), it is possible to set various recommended item conditions with a high degree of freedom and follow a complicated sales policy of a seller.

A store format such as shown in FIG. 9(*d*) may be used. In this case, the control section 10 interprets a table as follows and gets final recommended item condition data. Condition types and condition data are the same in meaning as those in FIG. 9(*c*).

In order of combination level from the smallest, rows of the same combination level are combined. At that time, the table is divided into sections (blocks) each having rows with the same combination level and serial row numbers, and the blocks are sequentially processed in order of row number from the smallest.

In the example of FIG. 9(*d*), since rows with the combination level "1" are rows having row numbers "1" to "3" and row numbers "5" to "6" and a row with a row number "4" between them has a different combination level, division into two blocks is done. Specifically, division into a block "1" with row numbers "1" to "3" and a block "2" with row numbers "5" to "6" is done, and processing is made as to the block "1" with smaller row numbers first. The logical type in the row numbers "2" and "3" is logical disjunction "∪" and the three rows in the block "1" are combined by logical disjunction, and thereby there is obtained a condition equation as ("creator: Creator-3" or "creator: Creator-10" or "category: Category-5").

In connection with combining the two rows in the block "2", since a negative flag (not flag) is set in the row number "5" ("O" in FIG. 9(*d*)), the row number "5" is interpreted as a negative form. An expression "~2010/3/31" indicates that an item time information piece is on or before Mar. 31, 2010. Since the not flag is set "O", it is interpreted as a meaning that the item time information piece is after (later than) Mar. 31, 2010. Since the logic type in the row number "6" is logical product "∩", the block "2" corresponds to a condition equation as ("an item time information piece is after Mar. 31, 2010" and "a rank about the number of times of use is between 1000 and 1999").

Next, blocks are combined by using a logic type corresponding to a combination level greater in value by 1 than the combination level used in making the blocks. In the example of FIG. 9(d), the block "1" and the block "2" are combined by using logical product "∩" that is the logical type in the row number "4" having a combination level of "2". Then, there is made a condition equation as (("creator: Creator-3" or "creator: Creator-10" or "category: Category-5") and ("an item time information piece is after Mar. 31, 2010" and "a rank about the number of times of use is between 1000 and 1999")). An item or items which satisfy this condition equation are decided to be an item or items satisfying the recommended item conditions. By using the store format of FIG. 9(d), it is possible to set more various recommended item conditions with a higher degree of freedom.

In this way, by using a store format such as shown in FIG. 9(c) or FIG. 9(d), recommended item conditions can be flexibly set so that the number of items accorded with a sales policy can be prevented from being excessively small or large.

The user attribute store section 111 stores user IDs and user attribute information pieces in a format such as shown in FIG. 10. The user attribute information pieces represent the name, sex, birth date, dwelling area, blood type, entrance time, hobby, favorite category, and favorite keyword for each user. A plurality of hobbies, a plurality of favorite categories, and a plurality of favorite keywords may be for one user. For example, when user registration is done, user attribute information pieces are obtained from a user and are stored in the user attribute store section 111.

With respect to a target user (a user being an object), the first rate calculating section 105 makes a first set being a set of items liked by the user (items accorded with user's taste). For the first set, the first rate calculating section 105 calculates a first rate equal to the ratio of the number of items accorded with the recommended item conditions to the number of all the items, and stores the calculated first rate in a memory area therein. Detailed steps of the processing by the first rate calculating section 105 will be described later.

With respect to a target user (a user being an object), the second rate calculating section 106 makes a second set being a set of items except those in the first set. For the second set, the second rate calculating section 106 calculates a second rate equal to the ratio of the number of items accorded with the recommended item conditions to the number of all the items, and stores the calculated second rate in a memory area therein. The second set of items is a set of items reflecting user's taste not so greatly. Detailed steps of the processing by the second rate calculating section 106 will be described later.

Each of the first rate calculating section 105 and the second rate calculating section 106 may not make a two-value decision as to whether or not a certain item is accorded with the recommended item conditions. Each of the first rate calculating section 105 and the second rate calculating section 106 may finely calculate the degree of the match between an item and the recommended item conditions on a multiple-value basis or a continuous-quantity basis by using the number of rows in the table which are accorded with the recommended item conditions.

In the example of FIG. 9(c), when a certain item "A" has three item attribute information pieces "Category-3", "Category-5", and "exciting", the match degree can be set to "3". When another item "B" has two item attribute information pieces "Category-5" and "dramatic", the match degree can be set to "2". Both the two items "A" and "B" satisfy the recommended item conditions while the item "A" is higher in match degree. A normalized match degree may be calculated through the use of a value resulting from dividing an accorded condition number by the total number of the recommended item conditions (the number of rows in the table for storing the recommended item conditions) or a value resulting from dividing the accorded condition number by the maximum number of conditions with which a plurality of items are accorded.

With respect to a target user (a user being an object), the user characteristic value calculating section 107 calculates a user characteristic value representing the strength of the relation between user's taste and the recommended item conditions. The user characteristic value calculating section 107 stores the calculated user characteristic value in a memory area therein while relating the user ID and the calculated user characteristic value with each other. Detailed steps of the processing by the user characteristic value calculating section 107 will be described later.

The item selecting section 108 selects an item or items, which are suited to a target user, by using the user characteristic value and the favorite item set, and generates recommendation information. Detailed steps of the processing by the item selecting section 108 will be described later.

The sending and receiving section 109 implements processes of sending and receiving data to and from the item providing server 20 via the network 40 or the network 42.

Operation of the whole of the system will be explained with reference to a flowchart in FIG. 12. When a terminal device 30 accesses the item providing server 20 in response to a prescribed manipulation, an operation menu such as shown in FIG. 13 for obtaining item information is displayed on the indication device of the terminal device 30. A user monitors the picture on the indication device. If there is a segment of the operation menu which the user desires to use, the user actuates the input device to click an indication place corresponding to the desired menu segment and thereby selects the desired menu segment. There is indicated a "quit" button for ending the current operation. In the operation menu, "1) indicate recommended item information" is a choice for indicating recommendation information made by the information selecting device 10. Furthermore, "2) indicate item list" is a choice for indicating a list of items possessed by the item providing server 20 in, for example, alphabetical order regarding item titles or item creators. In addition, "3) item search" is a choice for forcing a user to input a keyword and indicating an item or items each containing the keyword in the item title or the description information, or a choice for forcing the user to designate a desired category and indicating an item or items accorded with the desired category. In the case of the indication of recommendation information, only recommendation information pieces accorded with a keyword or a category designated by a user may be indicated. Each of the choices in the shown operation menu is an example, and another choice may be prepared instead thereof.

Figure 12:
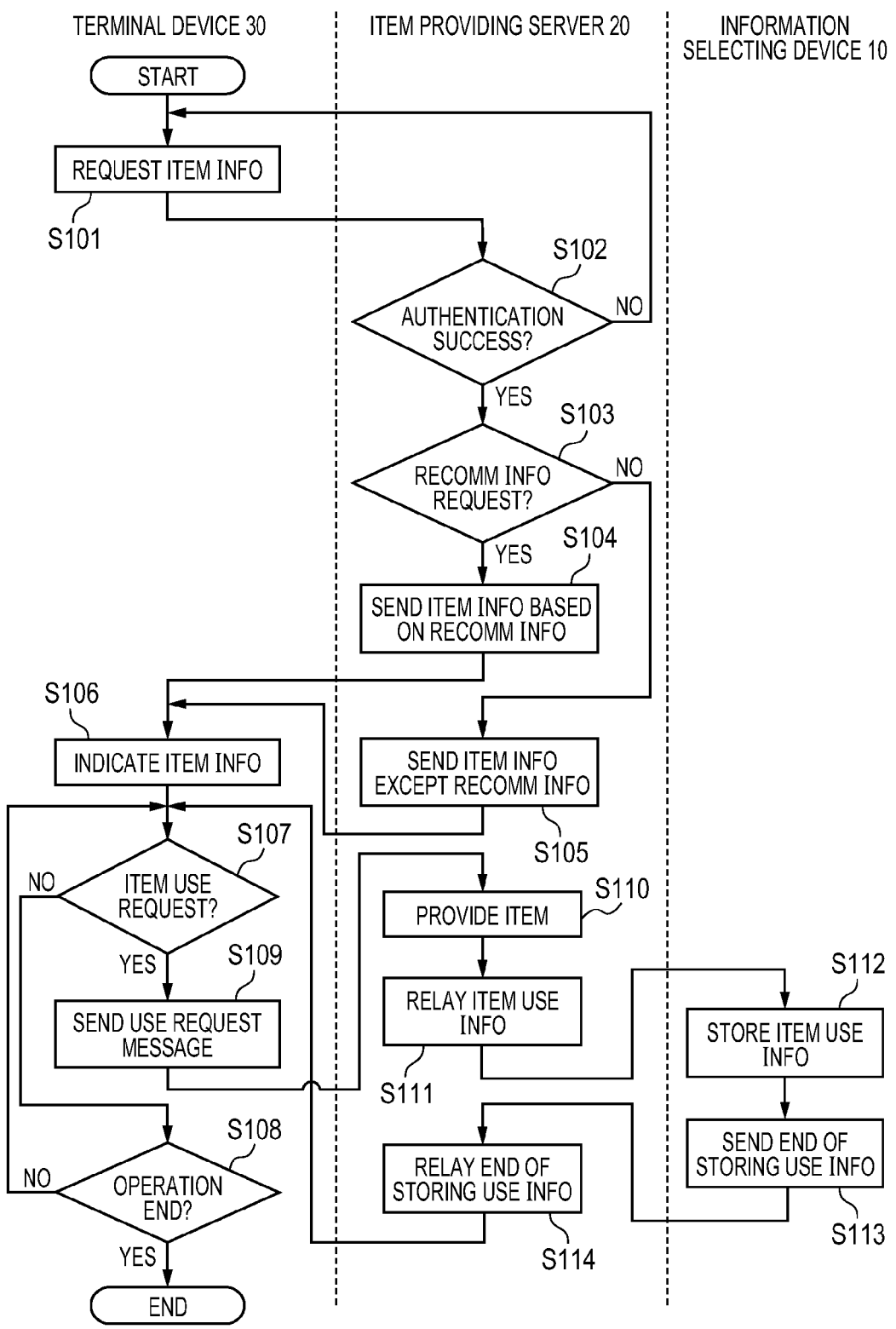
FIG. 12 is a flowchart of operation of the whole of the system.
Figure 13:
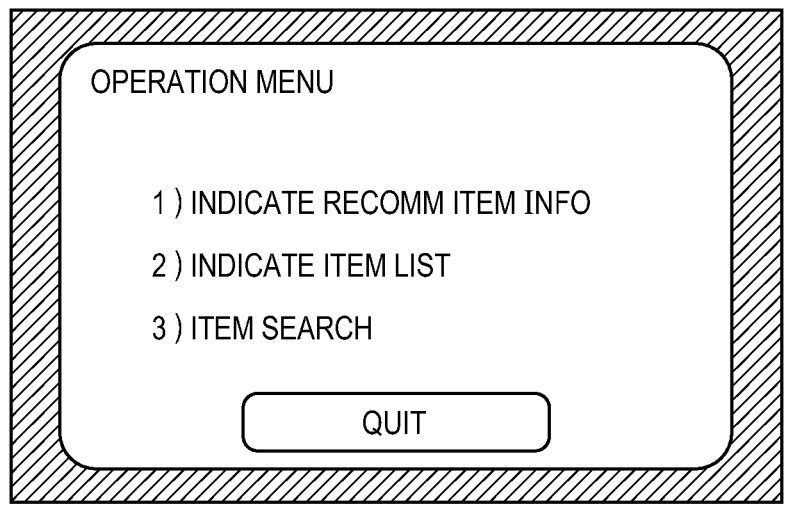
FIG. 13 is a diagram showing an example of indication of an operation menu for obtaining item information.

With reference to FIG. 12, first in a step S101, when the terminal device 30 receives a command from a user via the input device, it sends a message for requesting item information to the item providing server 20. This message contains preset user ID for identifying a user, a password, and information (type of request information) representing a choice selected from the above-mentioned operation menu. In the case where the user designates a keyword and a category to narrow recommendation information to be indicated, information pieces representative thereof are contained.

Next, in a step S102, the authentication section 201 of the item providing server 20 receives the message for requesting item information via the sending and receiving section 204, and performs authentication and decides whether the authentication succeeds or fails.

When a user ID and a password in the received message agree with those stored in the authentication section 201 in advance (yes), it is decided that the authentication succeeds. In this case, advance to a step S103 is done. Otherwise (no), it is decided that the authentication fails. In this case, an authentication failure message is notified to the terminal device 30 via the sending and receiving section 204 to require doing the process from the step S101 again. In the step S101, a password may be not contained in an item information request message. In this case, the step S102 may not perform the process using a password.

Next, in the step S103, the control section 205 of the item providing server 20 decides whether or not the type of the request information in the item information request message corresponds to a recommendation information request. When recommendation information is requested (yes), advance to a step S104 is done. When other information is requested (no), advance to a step S105 is done.

In the step S104, the control section 205 of the item providing server 20 makes a list of item information pieces based on the recommendation information, and sends the made list to the terminal device 30 via the sending and receiving section 204. This list contains item IDs, item attribute information pieces, and information pieces of recommendation ranks. Specifically, the control section 205 extracts, from data in the recommendation information store section 203, recommendation information pieces having a user ID equal to the user ID for whom the authentication is done in the step S102. The control section 205 reads out item attribute information pieces corresponding to the item IDs in the extracted recommendation information pieces while referring to the item store section 202. Furthermore, the control section 205 combines the read-out item attribute information pieces and the recommendation ranks to make a list of recommended items, and sends the made list.

In the case where the user designates a specified category and requests a recommendation information piece, the recommendation information store section 203 and the item store section 202 are referred to and thereby there is provided a recommended information piece which has a user ID equal to the user ID regarding the authentication done in the step S101 and which corresponds to an item or items in a category equal to the designated category. In the case where the user designates a keyword and requests a recommendation information piece, the recommendation information store section 203 and the item store section 202 are referred to and thereby there is provided a recommended information piece which has a user ID equal to the user ID regarding the authentication done in the step S101 and which corresponds to an item or items each containing the designated keyword in the item attribute information piece such as "title", "creator", and "description information".

In the step S105, the control section 205 of the item providing server 20 makes a list of item information pieces on the basis of information except the recommendation information, and sends the made list to the terminal device 30 via the sending and receiving section 204. This list contains item IDs and item attribute information pieces.

For example, when "2) indicate item list" is selected in the operation menu of FIG. 13, a list of item titles or creators in, for example, alphabetical order is made while the item store section 202 is referred to. The made list is sent. Such a list may be made in advance before being stored in the item store section 202. In this case, the made list is read out and sent in the step S105.

When "3) item search" is selected in the operation menu of FIG. 13 and the item information request message contains a search condition such as a keyword, the control section 205 makes a list of items accorded with the search condition and sends the made list in the step S105.

In a step S106, the terminal device 30 receives the item information (item list) sent by the step S104 or the step S105 and forces the indication device to indicate the received item information.

Figure 14:
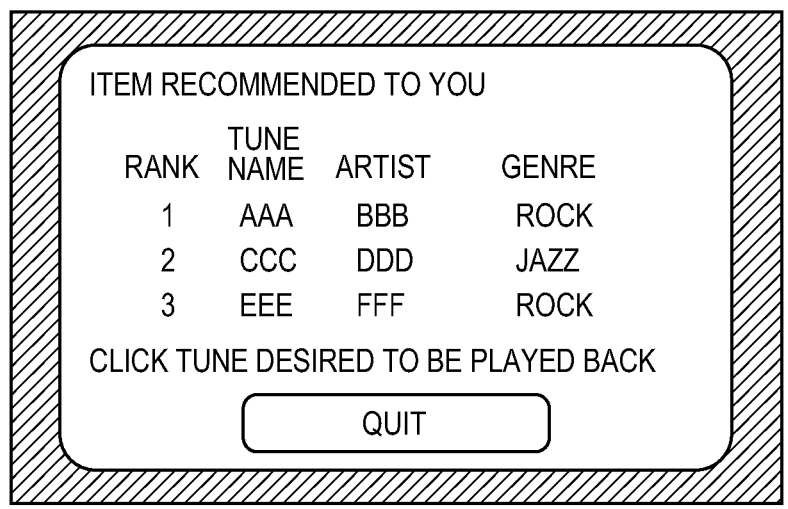
FIG. 14 is a diagram showing an example of indication of item information based on recommendation information.

FIG. 14 shows an example of an indication format of the recommended item information sent by the step S104. In the example of FIG. 14, items are music pieces, and tune names (titles), artist names (creators), and genres (categories) are indicated together with recommendation ranks as item attribute information pieces.

The user monitors the picture on the indication device. If there is an item which the user desires to use, the user actuates the input device to click an indication place corresponding to the desired item. In the case where items are, for example, music pieces, the user designates a music piece which the user desires to play back by clicking via the mouse or others. There is indicated a "quit" button for ending the current operation. A "list indication" button for indicating item information except recommendation information and a "search condition designation" button for designating a keyword and indicating items accorded with the designated keyword may be indicated although they are not shown in the example of FIG. 14. In this case, a command from the user is received, and a process corresponding to the received command is done. While the item IDs in the received item information are not indicated on the indication device, the terminal device 30 stores and manages the item IDs corresponding to the items indicated on the indication device.

In a step S107, the terminal device 30 decides whether or not a request for the use of an item from the user is inputted via the input device. The item use request may be representatively an item purchasing request, and may contain various requests such as a request for the playback of the item, a request for the preview of the item, a request for the indication of detailed information of the item, and a request for the registration of evaluation information (evaluation value) regarding the item.

When the item use request is inputted (yes), advance to a step S109 is done. Otherwise (no), advance to a step S108 is done. In the step S108, the terminal device 30 decides whether or not an operation ending command from the user is inputted via the input device. When the operation ending command is inputted (yes), the current process is ended. Otherwise (no), return to the step S107 is done and the process is repeated.

In the step S109, the terminal device 30 sends a message of an item use request to the item providing server 20. This message contains the user ID of the user who is using the terminal device 30 and the item ID of the item designated by the user. A use time information piece representing the date of sending the use request may be contained in the message. Depending on the type of the use request, a necessary parameter (for example, an evaluation information piece) is contained in the message. In the case where the user desires to use a plurality of items at once, the item IDs of the items may be contained in one use request message. Alternatively, a plurality of use request messages may be sent.

In a step S110, when the sending and receiving section 204 of the item providing server 20 receives the use request message for an item from the terminal device 30, the control section 205 performs a process of providing the designated item to the user who is using the terminal device 30. For example, in the case where the item to be provided is digital contents, the control section 205 reads out the item body corresponding to the item ID in the use request message before sending the read-out item body to the terminal device 30 via the sending and receiving section 204. When the item is a good (a commodity), the control section 205 performs, for example, a delivery process of sending information of a delivery request to a system of a delivery enterprise. At this time, the control section 205 performs a charging process if necessary. In the case where detailed information about the item is requested, the control section 205 reads out, for example, the corresponding "description information" piece from the item store section 202 and sends it to the terminal device 30.

In a step S111, the sending and receiving section 204 of the item providing server 20 sends the item use request message which has come from the terminal device 30 to the information selecting device 10, and hence relays it.

Next, in a step S112, the control section 110 of the information selecting device 10 receives the item use request message via the sending and receiving section 109 and stores the item use information in the use history store section 102. In a step S113, the control section 110 sends a message, which indicates that storing the item use information has ended, to the item providing server 20 via the sending and receiving section 109.

Next, in a step S114, the control section 205 of the item providing server 20 receives the message, which indicates that storing the item use information has ended, via the sending and receiving section 204, and sends it to the terminal device 30 via the sending and receiving section 204. When receiving the message, the terminal device 30 repeats the process from the step S107. The above is the operation of the whole of the system which occurs when the user uses an item.

According to the present embodiment of this invention, in the step S101, the terminal device 30 sends a message for requesting recommendation information to the item providing server 20. In the step S104, the item providing server 20 sends the recommendation information to the terminal device 30. This method may be replaced by another method. For example, the terminal device 30 may send a message for requesting recommendation information to the information selecting device 10 directly or via the item providing server 20, and the information selecting device 10 may send the recommendation information to the terminal device 30 directly or via the item providing server 20. In this case, the recommendation information store section 203 can be omitted from the item providing server 20.

According to the present embodiment of this invention, in the step S111, the item providing server 20 relays the item use information (message for requesting use of the item). This method may be replaced by another method. For example, the terminal device 30 may send the item use information directly to the information selecting device 10 at a suitable timing. In the step S113, the information selecting device 10 may send the recommendation information to the item providing server 20 or the terminal device 30. For example, the recommendation information corresponding to the user ID in the use request message may be sent.

A description will be given of processing operation of the information selecting device 10. First, with reference to a flowchart in FIG. 15, a description will be given of operation in which the information selecting device 10 makes and sends recommendation information, and the item providing server 20 receives it.

When the control section 110 of the information selecting device 10 gives an operation starting command to the favorite item set making section 104 at a prescribed timing, the process is started. One of various conditions may be used as the prescribed timing. A prescribed time interval such as every 12 hours or every 24 hours may be used. The time interval may vary in a manner such that every 3 hours will be for Monday to Friday and every 6 hours will be for Saturday, and every 12 hours will be for Sunday. The time interval may vary depending on the season in a manner such that the time interval will be shorter for summer and longer for winter.

The prescribed timing may be a timing at which the use request message (the use information) has been received a prescribed number of times. In this case, the prescribed number of times may be once so that recommendation information will be made upon every reception of the use information. Furthermore, the recommendation information may be made each time recommendation information is requested by the terminal device 30 or the item providing server 20.

In the following description, a set of target users (users being objects) for which recommendation information should be made will be called a recommendation target user set, and one user in the recommendation target user set will be called a recommendation target user. In the case where recommendation information is made at a timing defined by, for example, prescribed time intervals, recommendation information pieces are made for respective users relating to recommendation information pieces that can be made at that time. Thus, a recommendation target user set has a plurality of persons. In the case where recommendation information is made each time use information is received, a user contained in a recommendation target user set is one who has requested the use information and it is good to make only recommendation information for this user. Also in the case where recommendation information is made each time it is requested, a user contained in a recommendation target user set is one who has requested the recommendation information.

Figure 15:
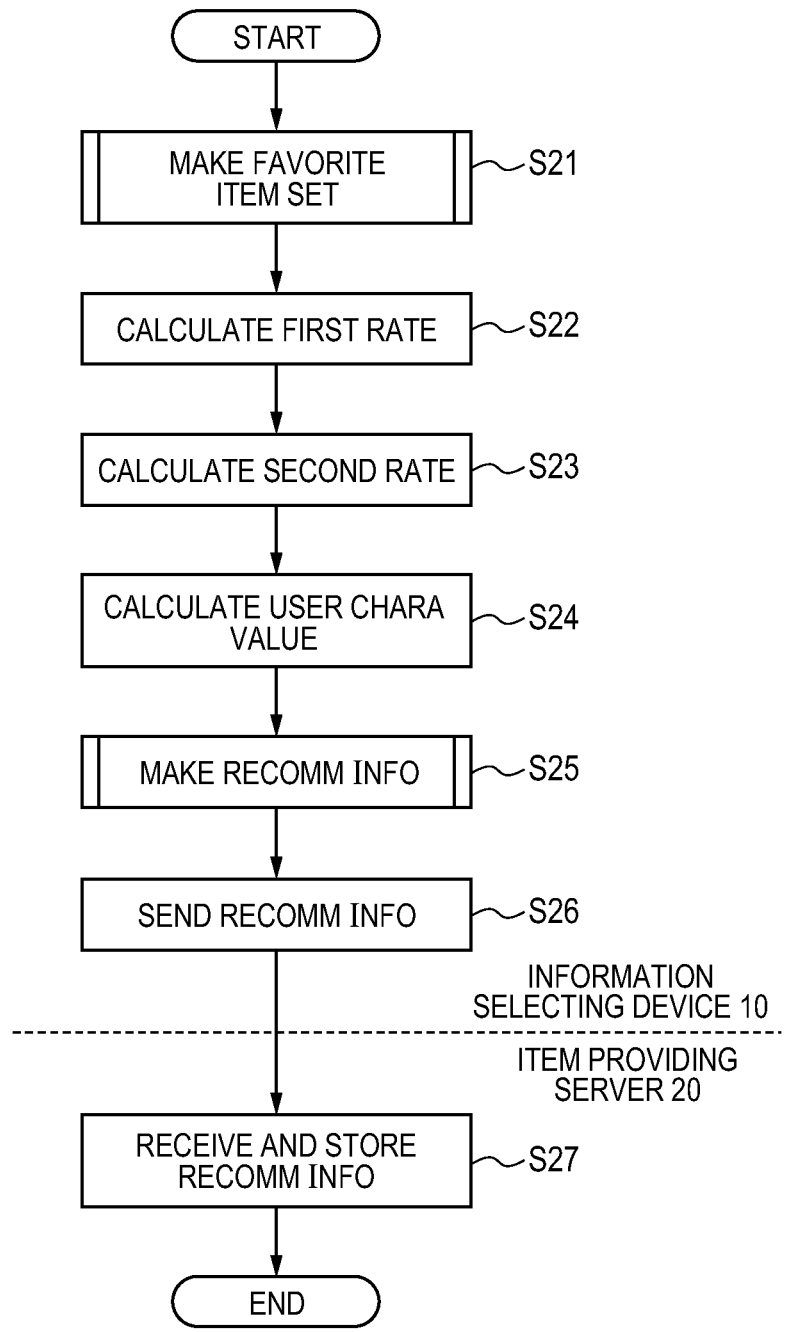
FIG. 15 is a flowchart of operation in which the information selecting device makes recommendation information and sends it, and the item providing server receives it.

First, in a step S21 of FIG. 15, the favorite item set making section 104 calculates the degrees of taste (preference) for items by using use histories in the use history store section 102 for each user in the recommendation target user set, and selects items corresponding to greater ones among the calculated degrees of taste and makes the selected items into a favorite item set for each user in the recommendation target user set. In the case of handling items of such character that a user does not use (purchase) a same item plural times in principle as in service (download type service) in which the terminal device 30 stores contents downloaded from the item providing server 20 and the stored contents are allowed to be repetitively played back, it is preferable that an item which has already been purchased by a target user should not be contained in the favorite item set.

Next, in a step S22, with respect to the favorite item set for the recommendation target user that is made by the step S21 or a first set being a set of items corresponding to the use histories in the use history store section 102, the first rate calculating section 105 calculates a first rate equal to the ratio of the number of items accorded with the recommended item conditions in the recommended item condition store section 103 to the number of all the items.

Subsequently, in a step S23, the second rate calculating section 106 makes a second set being an item set containing items except those in the first set. With respect to the second set, the second rate calculating section 106 calculates a second rate equal to the ratio of the number of items accorded with the recommended item conditions in the recommended item condition store section 103 to the number of all the items.

Next, in a step S24, the user characteristic value calculating section 107 calculates a user characteristic value representing the strength of the relation between the taste (preference) of the recommendation target user and the recommended item conditions.

Next, in a step S25, the item selecting section 108 selects items suited to the recommendation target user by using the user characteristic value and the favorite item set to make recommendation information. The recommendation information is designed so that the user ID (the user ID of the recommendation target user), the item IDs, and the recommendation ranks are made in correspondence with each other as in the data format described regarding the recommendation information store section 203 of the item providing server 20.

Next, in a step S26, the control section 110 sends the recommendation information, which has been made by the step S25, to the item providing server 20 via the sending and receiving section 109.

Finally, in a step S27, the control section 205 of the item providing server 20 receives the recommendation information via the sending and receiving section 204 and stores it into the recommendation information store section 203 in the format of FIG. 5. In the step S104, the item providing server 20 makes a list of item information pieces (recommendation information for indication) by using the stored recommendation information. In the case where old recommendation information is already in the recommendation information store section 203, the old recommendation information is erased before the new recommendation information is stored thereinto. The date of the storing may be stored as a version information piece so that a plurality of versions of recommendation information may be simultaneously stored.

The steps S26 and the step S27 are omitted in the case where as mentioned above, the terminal device 30 sends the recommendation information request message to the information selecting device 10 directly or via the item providing server 20, and the information selecting device 10 sends the recommendation information to the terminal device 30 directly or via the item providing server 20, and the recommendation information store section 203 is omitted from the item providing server 20.

When the information selecting device 10 sends the recommendation information to the terminal device 30 directly or via the item providing server 20, the control section 110 of the information selecting device 10 makes a list of item information pieces based on the recommendation information inclusive of the item IDs, the item attribute information pieces, and the information pieces of the recommendation ranks while referring to the item attribute store section 101 and the item selecting section 108 in a method similar to that mentioned regarding the step S104. Then, the control section 110 sends the item information list to the terminal device 30 directly or via the item providing server 20.

In the case where the information selecting device 10 sends the recommendation information to the terminal device 30 via the item providing server 20 so that the information selecting device 10 sends the recommendation information to the item providing server 20 first, the item providing server 20 may implement a process of making a list of item information pieces based on the received recommendation information before sending the item information list to the terminal device 30.

The process of making the favorite item set (the step S21) by the information selecting device 10 will be described below in detail. A first method of the favorite item set making process will be described with reference to a flowchart of FIG. 16.

Figure 16:
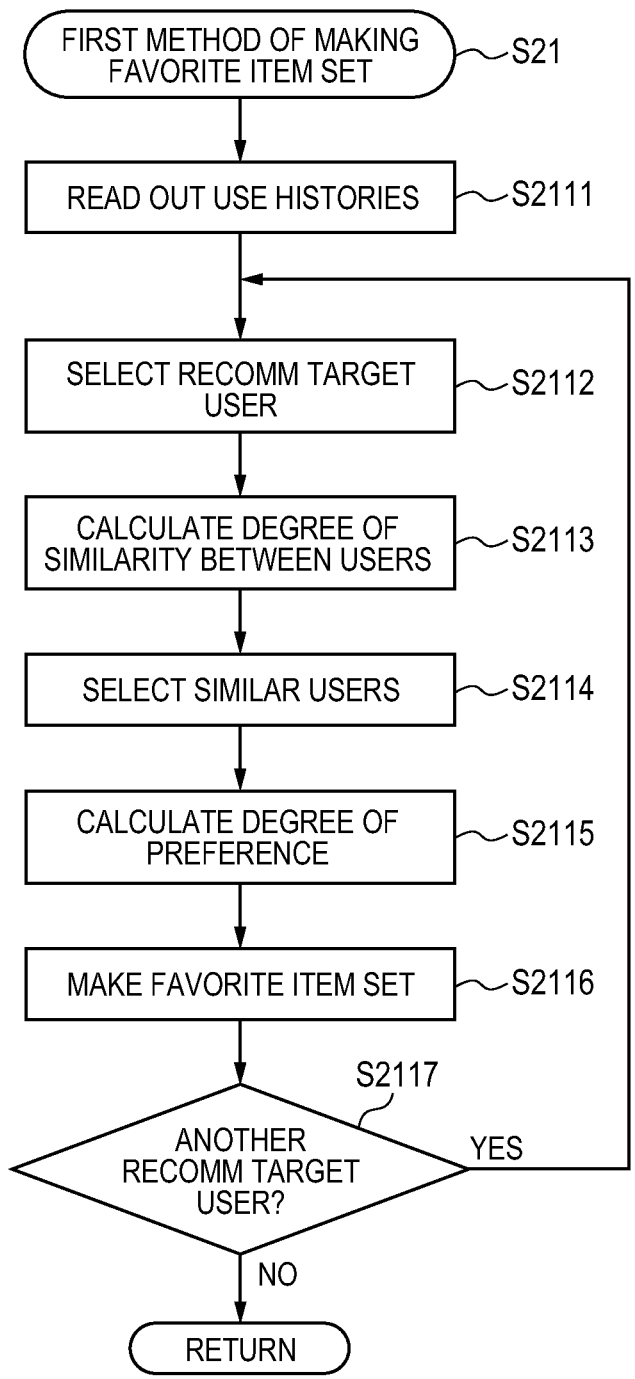
FIG. 16 is a flowchart of a first method of a favorite item set making process.

In a step S2111 of FIG. 16, the favorite item set making section 104 reads out the use histories from the use history store section 102. All the use histories may be read out. Only ones of the use histories that meet prescribed conditions may be read out. For example, the read-out may be done of use histories satisfying the conditions that the use time information of the use histories is in a prescribed range, for example, the use time is in the past 4 months or the difference between the use time and the present time is between 3 days and 30 days. For each user, the read-out may be done of a prescribed number of use histories or less use histories arranged in order of use time from the newest. For example, in the case where the prescribed number is 20, the read-out is done of 20 use histories in order of use time from the newest for a user corresponding to the number of times of use being 20 or more, and the read-out is done of all use histories for a user corresponding to the number of times of use being less than 20. In this case, a favorite item set can made even for a user who corresponds to a small use frequency and has not used items recently. A set of the user IDs contained in the use histories read out by this step is denoted by $\sigma$, and the number of different user IDs (the number of users) is denoted by Us, and the number of different items is denoted by Ms.

Next, in a step S2112, the favorite item set making section 104 selects a recommendation target user u. In the case where recommendation information is made each time a use or recommendation information request is received from another device (the terminal device 30 or the item providing server 20) as mentioned above, the user (user ID) in the use or recommendation information request becomes the recommendation target user u. In other cases, the user set $\sigma$ made by the step S2111 is handled as a recommendation target user set. Then, one user (unprocessed user) who has not yet been processed is selected from the user set $\sigma$, and is labeled as the recommendation target user u. Thus, a favorite item set is made for each of the user IDs in the use histories satisfying the prescribed conditions.

Next, in a step S2113, the favorite item set making section 104 calculates the degree of similarity between the recommendation target user u and another user y ($y \in \sigma$, $u \neq y$) in the user set $\sigma$ by using the use histories read out by the step S2111.

Specifically, a set of items which have been used by the user u is denoted by I[u], and a set of items which have been used by the user y is denoted by I[y]. The number of items which have been used by both the user u and the user y is denoted by $|I[u] \cap I[y]|$, and the number of items which have been used by at least one of the user u and the user y is denoted by $|I[u] \cup I[y]|$. The degree W[u][y] of similarity between the user u and the user y can be calculated by using a Jaccard coefficient as expressed in the following equation.

$$W[u][y] = \frac{|I[u] \cap I[y]|}{|I[u] \cup I[y]|}$$

In the case where information about the number of times of use or information about the evaluation (the evaluation value) made by the user for the item is obtained from the use histories read out by the step S2111, the degree of similarity may be calculated by using a cosine measure or a Pearson product-moment correlation coefficient. For example, the evaluation value or the number of times of use of an item i by the user u is denoted by E[u][i], and the evaluation value or the number of times of use of the item i by the user y is denoted by E[y][i]. The degree W[u][y] of similarity between the user u and the user y can be calculated by using a cosine measure as expressed in the following equation.

$$W[u][y] = \frac{\sum_{i=1}^{Ms} E[u][i] \times E[y][i]}{\sqrt{\sum_{i=1}^{Ms} E[u][i]^2} \sqrt{\sum_{i=1}^{Ms} E[y][i]^2}}$$

The similarity degree W[u][y] may be calculated by using a Pearson product-moment correlation coefficient as expressed in the following equation.

$$W[u][y] = \frac{\sum_{i \in Ic[u][y]} (E[u][i] - Ea[u])(E[y][i] - Ea[y])}{\sqrt{\sum_{i \in Ic[u][y]} (E[u][i] - Ea[u])^2} \sqrt{\sum_{i \in Ic[u][y]} (E[y][i] - Ea[y])^2}}$$

Here, Ic[u][y] denotes a set of items which have been used by both the user u and the user y, and Ea[u] denotes an average of the evaluation values or the numbers of times of use by the user u with respect to the item set Ic[u][y], and Ea[y] denotes an average of the evaluation values or the numbers of times of use by the user y with respect to the item set Ic[u][y]. The similarity degree W[u][y] may be calculated by using the Euclidean distance or another distance between E[u][i] and E[y][i].

According to another example, multivariate statistical analysis such as principal component analysis or mathematical quantification class 3 is applied to a matrix having elements formed by the numbers of times of use or the evaluation values E[u][i] (u=1~Us, i=1~Ms) of the item i by the user u to generate a vector reduced in number of dimensions, and the similarity degree is calculated by using the cosine measure or the Euclidean distance. Any other methods may be used as long as they provide indexes each representing the degree of similarity between the two users.

Next, in a step S2114, the favorite item set making section 104 selects similar users high in degree of similarity with the recommendation target user u. Specifically, users having the degrees of similarity with the recommendation target user u which are equal to or greater than a threshold value are selected from the user set σ, and the selected users are labeled as the similar users. A prescribed number of other users or less other users may be selected in order of degree of similarity with the recommendation target user u from the highest, and the selected users may be labeled as the similar users.

For example, in the case where the degrees of similarity are calculated as numerical values equal to or greater than 0, when the number of users having the degrees of similarity with the recommendation target user u which are greater than 0 is less than a prescribed number, all the users having the calculated similarity degrees are labeled as the similar users. On the other hand, when the number of users having the calculated similarity degrees is equal to or greater than the prescribed number, the prescribed number of users are selected in order of similarity degree from the highest as the similar users.

Users, the number of which does not exceed the prescribed number, may be selected in order of similarity degree from the highest among users having similarity degrees equal to or greater than a given value with respect to the recommendation target user u. In this case, the selected users are labeled as the similar users. The threshold value for the similarity degree may be adjusted on a user-by-user basis and similar users may be selected in response to the adjusted threshold value so that a prescribed number of similar users or more similar users can be obtained.

The favorite item set making section 104 stores the user ID of the recommendation target user u, the user IDs of the selected similar users, and the degrees of similarity therebetween in a memory area therein while relating them with each other in a format such as that in FIG. 11.

With reference to FIG. 11, the similar users are stored in order of similarity degree from the highest with respect to each recommendation target user. The number of similar users may depend on the recommendation target user u, or may be constant. A set of the similar users (set of the user IDs of the similar users) with respect to the recommendation target user u which are provided by this step is denoted by ω[u].

Next, in a step S2115, the favorite item set making section 104 calculates the degree of taste (preference) of the recommendation target user u for each item. Specifically, with respect to the items which have been used (or the items which have been evaluated) by the similar users, the degree P[u][i] of preference (taste) of the recommendation target user u for the item i is calculated in one of the following methods.

The first method of the preference degree calculation is to, for each item, count the number of times the similar users have used the item. Specifically, a set of items used by the users in the similar user set ω[u] is detected while the data read out by the step S2111 and the memory area in the favorite item set making section 104 are referred to. The result value of counting the number of times of use of each item i in the detected set is labeled as the preference degree P[u][i] (i=1~Ls[u]) where Ls[u] denotes the number of items in the set of items used by the similar users. The number of users (the number of different user IDs) who have used the item may be counted instead of the number of times of item use.

The second method of calculating the preference degree uses the degrees of similarity between users. The number of times the similar user z (z∈ω[u]) with respect to the recommendation target user u has used the item i is denoted by F[z][i], and the degree of similarity between the recommendation target user u and the similar user z is denoted by W[u][z]. The preference degree P[u][i] is calculated according to the below-indicated equation. In this case, an item used more frequently by users higher in similarity degree has a greater value of a popularity index.

$$P[u][i] = \sum_{z \in \omega[u]} F[z][i] \times W[u][z]$$

The third method of calculating the preference degree uses the degrees of similarity between users and the use time information, and implements the calculation according to the following equation.

$$P[u][i] = \sum_{z \in \omega[u]} \sum_{k=1}^{F[z][i]} W[u][z] \times f(Tc - Ta[z][i][k])$$

where Ta[z][i][k] denotes the use time information for the case where the similar user z uses the item i k-th time, and Tc denotes the prescribed time (for example, the date and hour of the time at which the calculation is made) newer than the time of use of the item. The function f(x) is a monotonically decreasing function such that the output value is greater as the input value is smaller. According to the above equation, an item that has recently been used more frequently by users higher in similarity degree corresponds to a greater preference degree P[u][i].

The fourth method of calculating the preference degree is used in the case where the values of evaluation of items by users are stored in the use history store section 102. In the fourth method, the value Fe[i] resulting from adding the values of evaluation by the similar users for each item ID is labeled as the preference degree P[u][i] (i=1~Ls). Only high evaluation values given by users may be added. For example, in the case of using 5-grade evaluation values such that "much like"=5, "like"=4, "neither like nor dislike"=3, "dislike"=2, and "much dislike"=1, the process may be done so as to add evaluation values equal to or greater than 4.

In each of the above methods, a process may be done while the item attribute store section 101 is referred to so that an item newer in item time information piece will have a greater preference degree.

Next, in a step S2116, the favorite item set making section 104 selects items high in preference degree P[u][i] to make a favorite item set corresponding to the recommendation target user u. Then, the favorite item set making section 104 stores the favorite item set and the user ID of the recommendation target user u in the memory area therein while making them in correspondence with each other.

Specifically, a first prescribed number of items or less items are selected in order of preference degree from the highest. When the number of items having calculated preference degrees is less than the first prescribed number, all of these items are selected. The first prescribed number may depend on user. Alternatively, items having preference degrees calculated by the step S2115 and higher than a prescribed threshold value (a first preference threshold value) may be selected. At that time, the first preference threshold value may be adjusted on a user-by-user basis so that the first prescribed number of items or more items can be selected.

Next, in a step S2117, the favorite item set making section 104 decides whether or not another recommendation target user can be selected. In the case where recommendation information is made each time a use or recommendation information request is received, the recommendation target user u is only one so that the result of the decision is "no". When a user who has not yet been processed is in the user set σ, the result of the decision is "yes". On the other hand, when a user who has not yet been processed is absent from the user set σ, the result of the decision is "no". In the case where the decision result is "yes", return to the step S2112 is done to repeat the process. In the case where the decision result is "no", the favorite item set making process is ended.

A second method of the favorite item set making process in the above step S21 will be described with reference to a flowchart of FIG. 17. In the case where the second method is used, it is necessary that item attribute information is stored in the item attribute store section 101.

Figure 17:
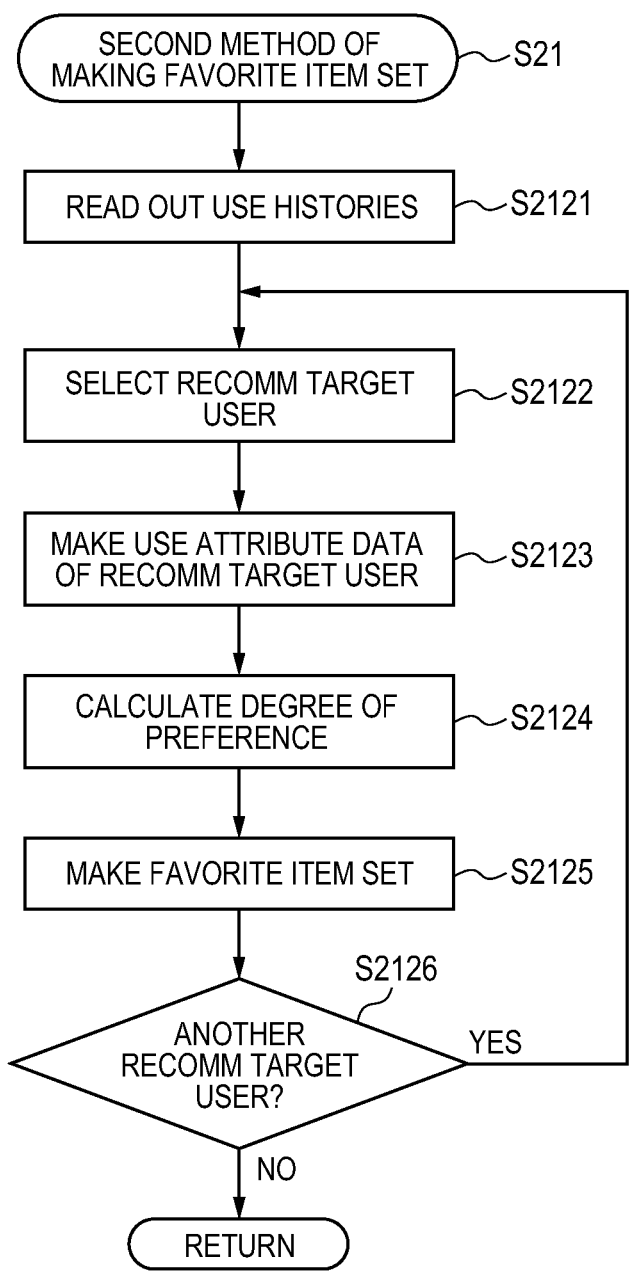
FIG. 17 is a flowchart of a second method of the favorite item set making process.

A step S2121 in FIG. 17 is of reading out the use histories, and is the same as the step S2111 in the first method. When there is only one recommendation target user, it is good to read out the use histories of that user and it is unnecessary to read out use histories of other users.

A step S2122 is of selecting a recommendation target user u, and is the same as the step S2112 in the first method.

Next, in a step S2123, the favorite item set making section 104 makes use attribute data about the recommendation target user. Specifically, the favorite item set making section 104 accesses the item attribute store section 101, and reads out the item attribute information pieces corresponding to the item IDs in the use histories of the recommendation target user which have been read out by the step S2121.

Then, a set of IDs or keywords in the read-out item attribute information pieces is labeled as use attribute data S[u]. Regarding "creator" among the item attribute information pieces, it is good that creator names are labeled as keywords or creator IDs for identifying creators are handled as keywords. Regarding "category", it is good that category names are labeled as keywords or category IDs for identifying categories are handled as keywords. Regarding "title" and "description information" of items, it is good that morphological element analysis is performed to extract prescribed words, and the extracted prescribed words are labeled as keywords. Since there is a good chance that items used by the recommendation target user u in the past are those liked by the recommendation target user u, the use attribute data S[u] that represents keywords corresponding to the items used by the recommendation target user u in the past can be regarded as data indicating the taste (preference) of the recommendation target user u.

Next, in a step S2124, the favorite item set making section 104 collates the use attribute data made by the step S2123 with each item in the item attribute store section 101 and calculates the degree P[u][i] of taste (preference) of the recommendation target user u for each item.

In a method similar to that by the step S2113, an item keyword set K[i] is made with respect to each item i in the item attribute store section 101, and the degree of preference between the item keyword set K[i] and the use attribute data S[u] made by the step S2123 is calculated. The preference degree can be calculated in one of various methods.

For example, the number of keywords common for the use attribute data S[u] and the item keyword set K[i] is denoted by |S[u]∩K[i]|, and the number of keywords in at least one of the use attribute data S[u] and the item keyword set K[i] is denoted by |S[u]∪K[i]|. The preference degree P[u][i] can be calculated by using a Jaccard coefficient as expressed in the following equation.

$$P[u][i] = \frac{|S[u] \cap K[i]|}{|S[u] \cup K[i]|}$$

According to another example, S[u] and K[i] are formed as vector data of the same number of dimensions, and then the preference degree P[u][i] is calculated by using a cosine measure or a Pearson product-moment correlation coefficient.

A next step S2125 is of making a favorite item set, and is the same as the step S2116 in the first method. A next step S2126 is of deciding whether or not another recommendation target user can be selected, and is the same as the step S2117 in the first method.

The above-mentioned second method of making a favorite item set can be used even in the case where use histories of users different from the recommendation target user are absent from the use history store section 102. Furthermore, an item absent from the use history store section 102, that is, an item (for example, a new item) which has been used by none of users, can be contained in the favorite item set.

In the first and second methods of making a favorite item set, it is necessary that the use histories read out by the step S2111 or S2121 contains the use histories of the recommendation target user. For example, in the case where recommendation information is made each time a recommendation information request is received, there is a chance that the above condition is not satisfied. Even in the case where the use histories of the recommendation target user are absent, a favorite item set can be made by using a third method shown in a flowchart of FIG. 18.

In the case where the third method of making a favorite item set is used, the user attribute store section 111 is necessary. On the other hand, in the case where the first or second method of making a favorite item set is used, the user attribute store section 111 may be omitted.

Figure 18:
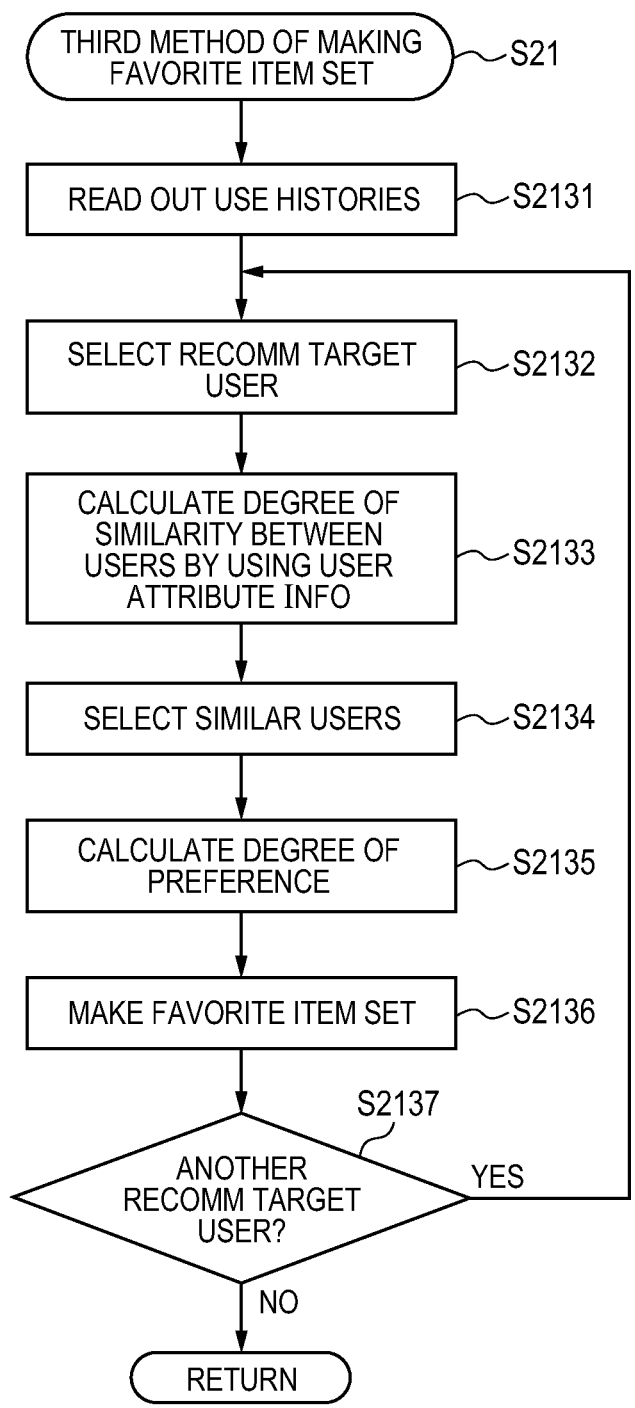
FIG. 18 is a flowchart of a third method of the favorite item set making process.

A step S2131 in FIG. 18 is of reading out the use histories, and is the same as the step S2111 in the first method. The use histories to be read out may not contain the use histories of the recommendation target user. A step S2132 is of selecting a recommendation target user, and is the same as the step S2112 in the first method.

Next, in a step S2133, the favorite item set making section 104 calculates the degrees of similarity between users by using the user attribute information in the user attribute store section 111.

Specifically, the favorite item set making section 104 calculates the degree of similarity between the recommendation target user u and another user y (y∈σ, u≠y) in the user set σ made by the step S2131.

In more detail, regarding the user attribute information pieces of the two users, it is good to count the number of heads corresponding to agreement between the two. Regarding heads such as "birth date" and "entrance time", a process may be done in a manner such that agreement is regarded as being present when the time difference in head between the two users is within a prescribed value. Regarding "favorite category" and "favorite keyword", complete agreement is regarded as agreement. Rules indicating the degrees of agreement (conformity) between categories or keywords may be stored in advance, and the degree of similarity may be calculated on the basis thereof. Regarding "blood type", the heads of the two users may be regarded as being in agreement not only when the blood types are the same but also when the blood types are well-assorted. The head "name" may not be used for the calculation of the similarity degree. The degree of similarity between the two users may be calculated by using onomancy based on the numbers of strokes of the characters representing the names or the pronunciations of the names. Regarding each head, the degree of similarity may be calculated by using an actual numerical value representing the degree of agreement rather than the binary value of "agreement/disagreement". Regarding blank cells in the heads, they may not be used for the calculation of the similarity degree, or a process may be done while they are regarded as being in agreement.

Subsequent steps S2134 to S2137 are the same as the steps S2114 to S2117 in the first method.

In the third method of making a favorite item set, the degree of similarity between the recommendation target user and another user is calculated by using the user attribute information rather than the use histories. Therefore, even when the use histories of the recommendation target user are completely absent, a favorite item set can be made.

In the first, second, and third methods of making a favorite item set, the information selecting device 10 (the favorite item set making section 104) calculates the preference degrees. Instead of the information selecting device 10, another device may calculate the preference degrees.

A detailed description will be given of the first rate calculation process by the step S22. The first rate calculating section 105 uses one of below-mentioned methods, and thereby performs the following actions. With respect to each user in the recommendation target user set, the first rate calculating section 105 makes a first set being a set of items liked by the user (items accorded with user's taste). For the first set, the first rate calculating section 105 calculates a first rate R1 equal to the ratio of the number of items accorded with the recommended item conditions to the number of all the items, and stores the calculated first rate in a memory area therein. For the simplicity of description, a process about one user (a recommendation target user u) in the recommendation target user set will be described. In the case where there is a plurality of recommendation target users, similar processes are performed for the respective users.

A first method of the first rate calculation process by the step S22 will be described below. In the first method, a first set is generated from the favorite item set made by the favorite item set making process by the step S21. Then, with respect to the first set, the rate of agreement with the recommended item conditions in the recommended item condition store section 103 is calculated. Thereafter, the calculated rate is labeled as the first rate.

All items in the favorite item set may be made into the first set. Ones of items in the favorite item set may be made into the first set. In the latter case, a prescribed number of items which is less than the number of all items in the favorite item set are selected at random, or selected in order of preference degree from the highest, and the selected items are made into the first set. The foregoing prescribed number may be equal to the number of items selected by the recommendation information making process by the step S25.

Next, the first rate calculating section 105 counts the number of the items in the first set, and labels the counted number as NA. The first rate calculating section 105 collates the item IDs in the first set with the recommended item conditions in the recommended item condition store section 103 which are shown in one of FIGS. 9(a)-9(d), and counts the number of items (item IDs) accorded with the recommended item conditions. Then, the first rate calculating section 105 labels the counted number as NB.

In the case where the recommended item conditions use condition types as in the format of FIG. 9(c) or FIG. 9(d), it is good to count the item IDs accorded with the recommended item conditions while referring to the item attribute store section 101. In the case where the condition type is "7" being the rank about the number of times of use or "8" being the number of times of use, the memory area in the recommended item condition store section 103 stores item IDs (a set of item IDs) accorded with the conditions, and the item ID set and the first set are compared and item IDs in agreement are counted.

The first rate calculating section 105 divides the number NB by the number NA to calculate a division result value (NB÷NA), and labels the division result value as a first rate R1. In the case where the recommended item conditions are stored with the format of FIG. 9(c) as previously mentioned and the degree of agreement (conformity) can be calculated, the first rate may be calculated by using the degree of agreement. Specifically, the degree of agreement is calculated for each item in the first set, and the representative value (for example, the mean, the median, or the mode) among the calculated degrees is labeled as the first rate. Normalization may be done to confine each agreement degree in the rage of from 0 to 1. This case is good since the representative value is held in the range of from 0 to 1 also.

A second method of the first rate calculation process by the step S22 will be described below. In the second method, a first set is made by using the use histories of the recommendation target user u. Then, with respect to the first set, the rate of agreement with the recommended item conditions in the recommended item condition store section 103 is calculated. Thereafter, the calculated rate is labeled as the first rate.

Since there is a good chance that items used by the recommendation target user u in the past are those liked by the recommendation target user u, the first set made by using the use histories can be regarded as being indicative of the taste (preference) of the recommendation target user u as in the first method.

First, the first rate calculating section 105 reads out the use histories of the recommendation target user u from the use history store section 102, and labels a set of item IDs in the read-out use histories as the first set. At that time, all the use histories of the recommendation target user may be read out. Alternatively, only ones of the use histories with the use times in a prescribed range may be read out. A prescribed number of the use histories may be read out at random, or read out in order of use time from the newest. The foregoing prescribed number may be equal to the number of items selected by the recommendation information making process by the step S25.

Then, the first rate calculating section 105 counts the number of the items in the first set, and labels the counted number as NC. Next, the first rate calculating section 105 collates the item IDs in the first set with the recommended item conditions in the recommended item condition store section 103 which are shown in one of FIGS. 9(a)-9(d), and counts the number of items accorded with the recommended item conditions. Then, the first rate calculating section 105 labels the counted number as ND.

In the case where the recommended item conditions use condition types as in the format of FIG. 9(c) or FIG. 9(d), it is good to count the item IDs accorded with the recommended item conditions while referring to the item attribute store section 101.

The first rate calculating section 105 divides the number ND by the number NC to calculate a division result value (ND÷NC), and labels the division result value as a first rate R1. As in the first method, the first rate may be calculated by using the degree of agreement (conformity).

A detailed description will be given of the second rate calculation process by the step S23. The second rate calculating section 106 uses one of below-mentioned methods, and thereby performs the following actions. With respect to each user in the recommendation target user set, the second rate calculating section 106 makes a second set being a set of items except the items in the first set. For the second set, the second rate calculating section 106 calculates a second rate R2 equal to the ratio of the number of items accorded with the recommended item conditions to the number of all the items. It is said that the items in the second set not so strongly correspond to the preference of the recommendation target user. The second rate calculating section 106 stores the user ID of the recommendation target user and the second rate in a memory area therein while making them in correspondence. For the simplicity of description, a process about one user (a recommendation target user u) in the recommendation target user set will be described. In the case where there is a plurality of recommendation target users, similar processes are performed for the respective users.

A first method of the second set making process by the step S23 will be described below. In the first method, a comparison user set containing users except the recommendation target user u is made, and the degree of preference (taste) between each user in the comparison user set and each item is calculated. Items high in degree of preference of each user in the comparison user set are selected, and the selected items are made into a candidate set. Then, a second set is generated from the candidate sets.

The calculation of the preference degrees and the selection of items high in preference degree can be implemented in a way similar to the operation of the favorite item set making section 104. The comparison user set has only one user or a plurality of users. Users for the comparison user set may be selected at random. For the comparison user set, ones may be selected from users having the degrees of similarity with the recommendation target user u which are equal to or less than a prescribed value. In the case where the comparison user set has a plurality of users, one of the users therein may be the recommendation target user u. For example, when the recommendation target user set has a plurality of users, the recommendation target user set may be labeled as the comparison user set.

Users for the comparison user set are selected so that the second set will have items except the items in the first set. Thus, the second set is made to be not a subset of the first set. It is sufficient that even when a candidate set for one user is a subset of the first set, a candidate set for another user is not a subset of the first set. Thus, one or ones of the items in the second set may be in the first set.

The method of generating the second set from the candidate sets includes a method of labeling a union of the candidate sets as the second set. In addition, there is a method of selecting, from a union of the candidate sets, a prescribed number of items in order of preference degree from the highest, and making the selected items into the second set. Items corresponding to preference degrees equal to or higher than a prescribed value may be selected from the union of the candidate sets before the selected items are made into the second set.

Next, a second method of the second set making process by the step S23 will be described below. In the second method, the preference degree between the recommendation target user and each item is calculated. Then, items lower in preference degree than the items in the favorite item set are selected, and the selected items are made into the second set.

The calculation of the preference degrees can be performed in a method similar to the operation of the favorite item set making section 104. In the case where the favorite item set is made by using the threshold value regarding the preference degree in the favorite item set making process by the step S2116, items corresponding to preference degrees less than the threshold value (the first preference threshold value) are selected.

It is good to select a prescribed number of items corresponding to preference degrees less than the first preference threshold value in order of preference degree from the highest or the lowest. Alternatively, a prescribed number of items may be selected at random from items corresponding to preference degrees less than the first preference threshold value. A second preference threshold value less than the first preference threshold value and a third preference threshold value less than the second preference threshold value may be prepared. In this case, items corresponding to preference degrees between the second preference threshold value and the third preference threshold value are selected.

In the case where a prescribed number of items or less items are selected in order of preference degree from the highest in the favorite item set making process by the step S2116, a first rank value greater than the number of selected items (the number of elements in the favorite item set) is prepared. Then, the items are sorted so that an item corresponding to a higher preference degree will have a smaller rank value. Thereafter, items having rank values equal to or above the first rank value are selected.

For example, in the case where the number of elements constituting the favorite item set is 20 and the items are sorted in order of preference degree from the highest, it is good to select items having rank values equal to or later than the 21-st rank. In this case, from items having rank values equal to or later than the 21-st rank, a prescribed number of items may be selected at random or in order of preference degree from the highest or the lowest. A second rank value greater than the first rank value may be prepared. In this case, items having rank values between the first rank value and the second rank value are selected. In the above-mentioned example, when the second rank value is set to the 40-th rank, it is good to select items having rank values between the 21-st rank and the 40-th rank.

A third method of the second set making process by the step S23 will be described below. In the third method, a comparison user set containing users except the recommendation target user u is made, and the use histories of the users in the comparison user set are used. Specifically, the use histories of the users in the comparison user set are read out from the use history store section 102, and the item IDs in the read-out use histories are made into the second set. All the use histories corresponding to the users in the comparison user set may be read out. Alternatively, the use histories corresponding to the users in the comparison user set and satisfying prescribed conditions may be read out.

For example, the read-out may be done of use histories satisfying the conditions that the use time information of the use histories is in a prescribed range, for example, the use time is in the past 4 months or the difference between the use time and the present time is between 3 days and 30 days. From the use histories of each user in the comparison user set, a prescribed number of use histories may be selected in order of use time from the newest. The comparison user set has only one user or a plurality of users. Users for the comparison user set may be selected at random. For the comparison user set, ones may be selected from users having the degrees of similarity with the recommendation target user u which are equal to or less than a prescribed value. In the case where the comparison user set has a plurality of users, one of the users therein may be the recommendation target user u. For example, when the recommendation target user set has a plurality of users, the recommendation target user set may be labeled as the comparison user set. All the user IDs in the use history store section 102 may be placed in the comparison user set.

Users for the comparison user set are selected so that the second set will have items except the items in the first set. Thus, the second set is made to be not a subset of the first set. For each of the item IDs in the read-out use histories, the numbers of times of use may be summed up. In this case, the items (item IDs) are sorted in order of total number of times of use from the greatest, and ones of the items (item IDs) which have ranks concerning total number of times of use and being in a prescribed range are made into the second set. For example, 10 items with first to tenth ranks concerning total number of times of use may be placed in the second set. According to another example, 20 items with 11-th to 30-th ranks concerning total number of times of use may be placed in the second set. The item IDs corresponding to total numbers of times of use in a prescribed range may be made into the second set.

A fourth method of the second set making process by the step S23 is as follows. In the fourth method, a prescribed number of item IDs are selected at random from the item IDs in the item attribute store section 101 or the item IDs in the use history store section 102, and the selected item IDs are made into the second set. Also in this case, the second set is made to be not a subset of the first set.

After making the second set in one of the above-mentioned methods, the second rate calculating section 106 counts the number NE of elements of the second set. The number of elements of the second set is equal to or different from that of the first set. With respect to the second set, the second rate calculating section 106 collates the item IDs in the favorite item set with the recommended item conditions in the recommended item condition store section 103 which are shown in one of FIGS. 9(a)-9(d), and counts the number NF of items (item IDs) accorded with the recommended item conditions.

The second rate calculating section 106 divides the number NF by the number NE to calculate a division result value (NF÷NE), and labels the division result value as a second rate R2. In the case of a plurality of recommendation target users, a second rate is calculated for each of the recommendation target users. In the case where the comparison user set has a plurality of users, the first and third methods of making the second set may be designed so that interim second rates will be calculated for each of the users, and then a representative value (for example, the mean, the median, or the mode) of the interim second rates will be calculated before the representative value will be labeled as a final second rate.

In the case where the recommended item conditions are stored with the format of FIG. 9(c) as previously mentioned and the degree of agreement (conformity) can be calculated, the second rate may be calculated by using the degree of agreement. Specifically, the degree of agreement is calculated for each item in the second set, and the representative value (for example, the mean, the median, or the mode) among the calculated degrees is labeled as the second rate. Normalization may be done to confine each agreement degree in the rage of from 0 to 1. This case is good since the representative value is held in the range of from 0 to 1 also.

A detailed description will be given of the user characteristic value calculation process by the step S24. The user characteristic value calculating section 107 uses one of below-mentioned methods, and thereby performs the following actions. With respect to each user in the recommendation target user set, the user characteristic value calculating section 107 calculates a user characteristic value representing the strength of the relation between the preference of the recommendation target user and the recommended item conditions. The user characteristic value calculating section 107 stores the user IDs of the recommendation target users and the user characteristic values in a memory area therein while making them in correspondence. For the simplicity of description, a process about one user (a recommendation target user u) in the recommendation target user set will be described. In the case where there is a plurality of recommendation target users, similar processes are performed for the respective users.

A first method of the user characteristic value calculation process will be described below. In the first method, the first rate R1 calculated by the step S22 is labeled as the user characteristic value. In the case where the first method is used, the second rate calculating section 106 and the step S23 can be omitted. The first method is the smallest in processing amount, and is simple.

A second method of the user characteristic value calculation process divides the first rate R1 by the second rate R2 to calculate a division result value (R1÷R2), and labels the division result value as the user characteristic value. In this case, the user characteristic value relatively represents the strength of the relation between the preference of the recommendation target user and the recommended item conditions while a comparison user is regarded as a reference.

In the first method of the user characteristic value calculation process, the user characteristic value is greater as the recommended item conditions in the recommended item condition store section 103 correspond to more items. The user characteristic value is smaller as the recommended item conditions in the recommended item condition store section 103 correspond to less items. Thus, the user characteristic value sensitively depends on the way of setting the recommended item conditions.

In the second method of the user characteristic value calculation process, since both the rates R1 and R2 are used, the user characteristic value is less affected by a variation in the recommended item conditions. Especially, in the case where the second rate R2 is calculated by using data of many users, the user characteristic value is much less affected by a variation in the recommended item conditions. Therefore, it is possible to accurately quantify the strength of the relation between the preference of the recommendation target user u and the recommended item conditions.

A third method of the user characteristic value calculation process subtracts the second rate R2 from the first rate R1 to calculate a subtraction result value (R1−R2), and labels the subtraction result value as the user characteristic value. In this case, the user characteristic value relatively represents the strength of the relation between the preference of the recommendation target user u and the recommended item conditions while a comparison user is regarded as a reference. Since the user characteristic value is much less affected by the way of setting the recommended item conditions as in the second method, it is possible to accurately quantify the strength of the relation between the preference of the recommendation target user u and the recommended item conditions.

The user characteristic value calculated in one of the above-mentioned methods is greater as the relation between the preference of the recommendation target user u and the recommended item conditions is stronger. The user characteristic value monotonically increases as the first rate R1 increases.

A detailed description will be given of the recommendation information making process by the step S25. A first method of the recommendation information making process will be described below with reference to a flowchart in FIG. 19.

Figure 19:
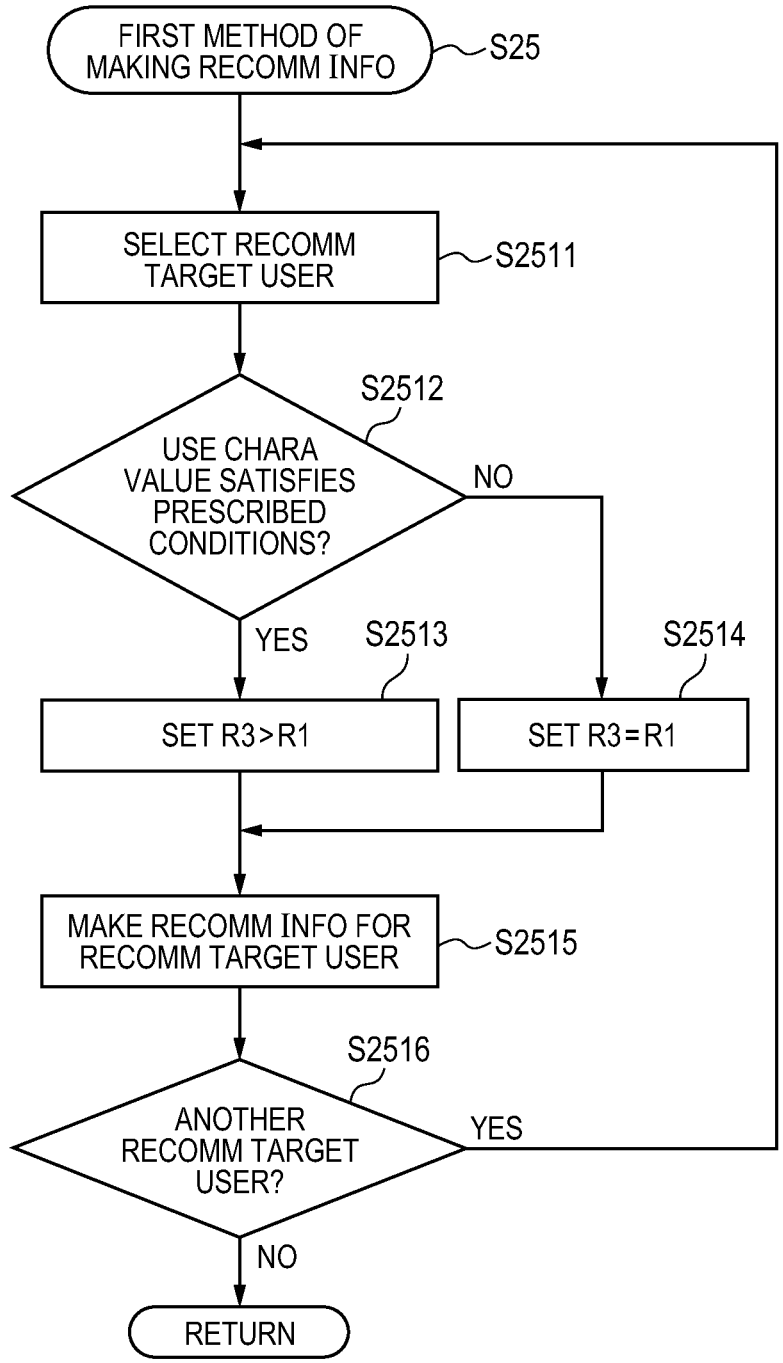
FIG. 19 is a flowchart of a first method of a recommendation information making process.

In a step S2511 of FIG. 19, the item selecting section 108 selects, from the recommendation target user set, a user to be processed (a recommendation target user u). Specifically, the user IDs of the recommendation target users and the favorite item sets are stored in the memory area in the favorite item set making section 104 during the favorite item set making process by the step S2116. Thus, the item selecting section 108 selects, from the user IDs in the memory area in the favorite item set making section 104, one user ID which has not yet been processed.

Next, in a step S2512, the item selecting section 108 decides whether or not the user characteristic value of the user selected by the step S2511 satisfies prescribed user characteristic value conditions. When the result of the decision is "yes", advance to a step S2513 is done. When the result of the decision is "no", advance to a step S2514 is done.

Specifically, the item selecting section 108 reads out the user characteristic value α corresponding to the recommendation target user u from the memory area in the user characteristic value store section 107, and decides whether or not the read-out user characteristic value α satisfies the prescribed user characteristic value conditions. The prescribed user characteristic value conditions may use decision conditions A as "$α>θ1$", where $θ1$ denotes a prescribed threshold value. The decision conditions A mean that the user characteristic value α is greater than the prescribed threshold value $θ1$. When the decision conditions A are used, it is possible to detect users corresponding to strengths of the relations between the preferences of the users and the recommended item conditions which are equal to or greater than a certain degree.

The decision conditions A may be replaced by decision conditions B as "$θ2>α>θ1$", where $θ2$ denotes a prescribed threshold value greater than the prescribed threshold value $θ1$ ($θ2>θ1$). When the decision conditions B are used, it is possible to detect users corresponding to strengths of the relations between the preferences of the users and the recommended item conditions which are equal to or greater than a certain degree but are not extremely great.

The decision can be made by directly using the first rate R1 as mentioned regarding the first method of the user characteristic value calculation process. This method is simple but may cause the following fact. In the case where the recommended item conditions in the recommended item condition store section 103 vary, it is not good to set the threshold values $θ1$ and $θ2$ as fixed values and the threshold values $θ1$ and $θ2$ may need to be adjusted in accordance with the variation in the recommended item conditions. On the other hand, when the second or third method of the user characteristic value calculation process is used, the necessity for the adjustment of threshold values $θ1$ and $θ2$ can be reduced.

In the step S2513, the item selecting section 108 sets a rate in number of items accorded with the recommended item conditions with respect to items to be placed in the recommendation information. This rate is referred to as a third rate R3.

In the step S2513, the third rate R3 is chosen to be greater than the first rate R1 calculated by the first rate calculating section 105 but smaller than 1. The reason for making the third rate R3 greater than the first rate R1 is that more items accorded with the recommended item conditions (the sales policy of the seller) are placed in the recommendation information about the recommendation target user.

The first rate R1 calculated by the first method of the first rate calculation process by the step S22 is a rate in number of items accorded with the recommended item conditions in the recommendation information (the normal recommendation information) in the case where items are selected in accordance with user's taste without consideration of the recommended item conditions. Thus, as compared with the normal recommendation information, items are accorded with the recommended item conditions at a higher rate.

The first rate R1 calculated by the second method of the first rate calculation process by the step S22 is a rate in number of items accorded with the recommended item conditions in the item set having the items used by the recommendation target user u in the past. Thus, if a user uses items in the recommendation information at equal probabilities, it is expected that items used by the user in future will be accorded with the recommended item conditions at higher rates than those regarding items used in the past.

The reason for making the third rate R3 smaller than 1 is as follows. If all items in the recommendation information are accorded with the sales policy of the seller, some user may susceptibly sense a common factor among the recommended items and interpret the common factor as a high-pressure selling or aggressive peddling attitude of the seller. Such a risk should be reduced.

A first method of the third rate setting process is to set the third rate R3 to a same value for all users corresponding to the result "yes" of the decision by the step S2512. For example, it is good that R3=0.8. In this case, the decision conditions B may be used, and the threshold value θ2 in the decision conditions B may be chosen so that the result of the decision by the step S2512 will not be "yes" for users corresponding to first rates R1 greater than 0.8.

A second method of the third rate setting process is to set the third rate R3 on the basis of the first rate R1. The second method will be described below with reference to FIGS. 20(a) and 20(b).

Figure 20A:
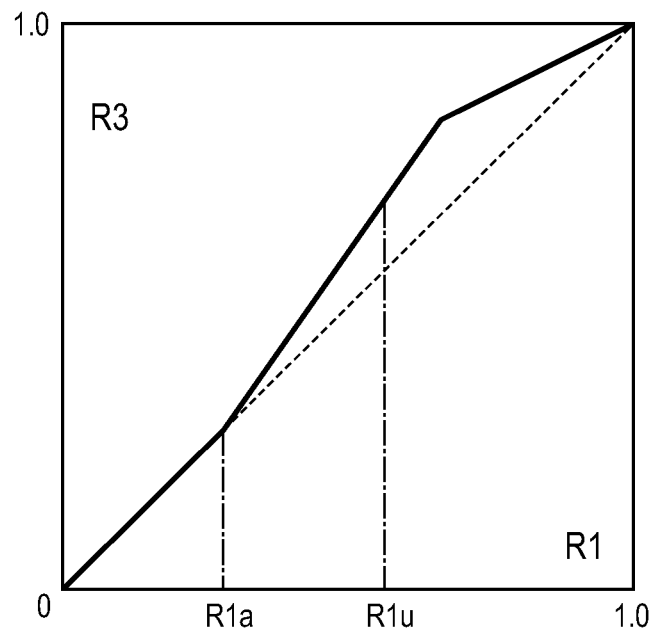
FIGS. 20(a) and 20(b) are diagrams each showing a relation between a first rate R1 and a third rate R3.

FIG. 20(a) shows the characteristic of the function for the conversion to the third rate R3 from the first rate R1 which is used in the case of use of the decision conditions A in the step S2512.

In FIG. 20(a), the abscissa denotes the first rate R1 while the ordinate denotes the third rate R3. Each of the first rate R1 and the third rate R3 takes a value in the range from 0 to 1. In FIG. 20(a), the broken line oblique at an angle of 45 degrees represents the case where the third rate R3 is set equal to the first rate R1, that is, the case where R3=R1. In addition, R1$u$ denotes a value of the first rate R1 for the recommendation target user u. Furthermore, R1$a$ denotes a value resulting from converting the threshold value θ1 for the user characteristic value of the recommendation target user u to the first rate R1.

In the characteristic of FIG. 20(a), when the first rate R1 is in the range of from 0 to the value R1$a$, the conversion function agrees with the broken line oblique at an angle of 45 degrees so that R3=R1. When the first rate R1 is in the range as "R1$a$<R1<1", the third rate R3 is greater than the first rate R1 (R3>R1).

The value R1$u$ that is the first rate R1 for a user subjected to the decision by the step S2512 is greater than the value R1$a$ so that there is obtained the third rate R3 greater than the first rate R1 but smaller than 1. It should be noted that a user related to a first rate R1 of 1 corresponds to a third rate R3 of 1 also.

Figure 20B:
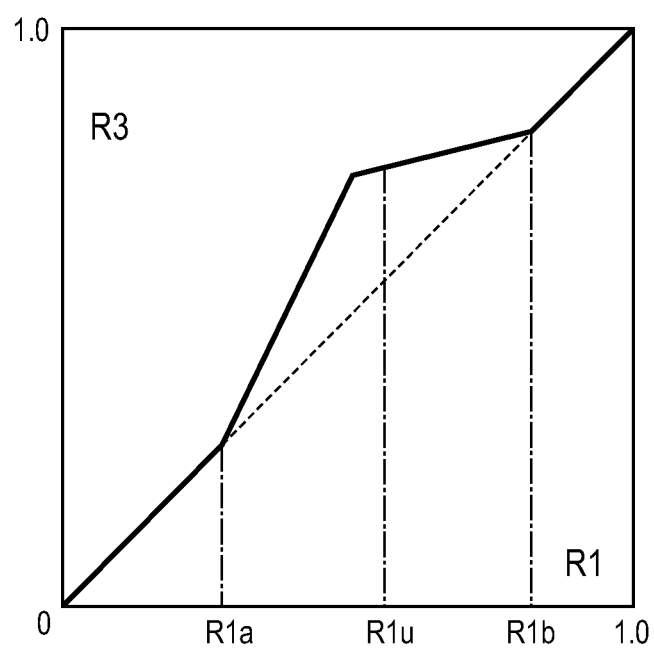

FIG. 20(b) shows the characteristic of the function for the conversion from the first rate R1 to the third rate R3 which is used in the case of use of the decision conditions B. In FIG. 20(b), R1$b$ denotes a value resulting from converting the threshold value θ2 for the user characteristic value of the recommendation target user u to the first rate R1.

In the characteristic of FIG. 20(b), when the first rate R1 is in the range as "0≦R1≦R1$a$", the conversion function agrees with the broken line oblique at an angle of 45 degrees so that R3=R1. When the first rate R1 is in the range as "R1$a$<R1<R1$b$", the third rate R3 is greater than the first rate R1 (R3>R1). When the first rate R1 is in the range as "R1$b$≦R1≦1", the third rate R3 is equal to the first rate R1 (R3=R1).

The value R1$u$ that is the first rate R1 for a user subjected to the decision by the step S2513 is between the values R1$a$ and R1$b$ (R1$a$<R1$u$<R1$b$) so that there is obtained the third rate R3 greater than the first rate R1 but smaller than 1. According to each of the conversion functions in FIGS. 20(a) and 20(b), the third rate R3 increases as the first rate R1 increases, and there is no interval where the third rate R3 decreases as the first rate R1 increases.

A user related to the result "yes" of the decision by the step S2512 corresponds to the strength of the relation between the preference of the user and the recommended item conditions which is equal to or greater than a certain degree. Therefore, such a user has only a small chance of feeling a high-pressure selling attitude of the seller and a good chance of gently making acceptance even when many items accorded with the recommended item conditions are in the recommendation information in comparison with a user related to the result "no" of the decision by the step S2512. Thus, by performing such a process, many items in line with the sales policy can be recommended in a manner such that the user can easily accept the presentation of the recommended items. By using the decision conditions B, it is possible to further reduce a risk of causing the user to feel a high-pressure selling attitude of the seller.

For a user related to the result "no" of the decision by the step S2512, the item selecting section 108 sets the third rate R3 equal to the first rate R1 in the step S2514. Thus, the number of items accorded with the recommended item conditions (the sales policy) is made to be not increased. This is for the following reason. A user related to the result "no" of the decision by the step S2512 corresponds to a not so strong relation between the preference of the user and the recommended item conditions. Accordingly, when the number of items accorded with the recommended item conditions (the sales policy) is made to be not increased, there is a better possibility that the recommendation information can be accepted by the user.

Next, in a step S2515, the item selecting section 108 selects items to be placed in the recommendation information in response to the third rate R3. When the item number NR regarding the recommendation information is decided, they are stored in the memory area in the favorite item set making section 104. The favorite item set for the recommendation target user u is read out. Then, (NR×R3) items accorded with the recommended item conditions are selected from the favorite item set in order of preference degree from the highest while the recommended item condition store section 103 is referred to. The selected items are in a first group.

Next, (NR×(1−R3)) items not accorded with the recommended item conditions are selected from the favorite item set in order of preference degree from the highest. The selected items are in a second group. The items in the first and second groups are ranked for recommendation in order of preference degree from the highest to make recommendation information. The first prescribed number and the first preference threshold value used in the step S2116 are chosen to make a favorite item set having a sufficient number of items in advance, so that NR items can be selected. Adjustment may be done so that at least one item being in the favorite item set and not accorded with the recommended item conditions will be placed in the recommendation information.

When the item number NR regarding the recommendation information is not decided, the following process is performed. First, the number NX of items in the favorite item set which are accorded with the recommended item conditions is counted, and the number NY of items in the favorite item set which are not accorded with the recommended item conditions is counted.

Next, the value of (NX/R3) and the value of (NY/(1−R3)) are compared. When the value of (NX/R3) is smaller, all the NX items in the favorite item set which are accorded with the recommended item conditions are selected. In addition, ((NX/R3)×(1−R3)) items in the favorite item set which are not accorded with the recommended item conditions are selected in order of preference degree from the highest. These selected items are placed in the recommendation information.

On the other hand, when the value of (NY/(1−R3)) is smaller, all the NY items in the favorite item set which are not accorded with the recommended item conditions are selected. In addition, ((NY/(1−R3))×R3) items in the favorite item set which are accorded with the recommended item conditions are selected in order of preference degree from the highest. These selected items are placed in the recommendation information. Adjustment may be done so that at least one item being in the favorite item set and not accorded with the recommended item conditions will be placed in the recommendation information.

Next, in a step S2516, the item selecting section 108 decides whether or not another recommendation target user can be selected. In the case where recommendation information is made each time a use or recommendation information request is received, the recommendation target user u is only one so that the result of the decision is "no". In other cases, when a user who has not yet been processed is among users for whom the favorite item sets have been made, the result of the decision is "yes". On the other hand, when a user who has not yet been processed is absent, the result of the decision is "no". In the case where the decision result is "yes", return to the step S2511 is done to repeat the process. In the case where the decision result is "no", the recommendation information making process by the step S25 is ended.

Figure 21:
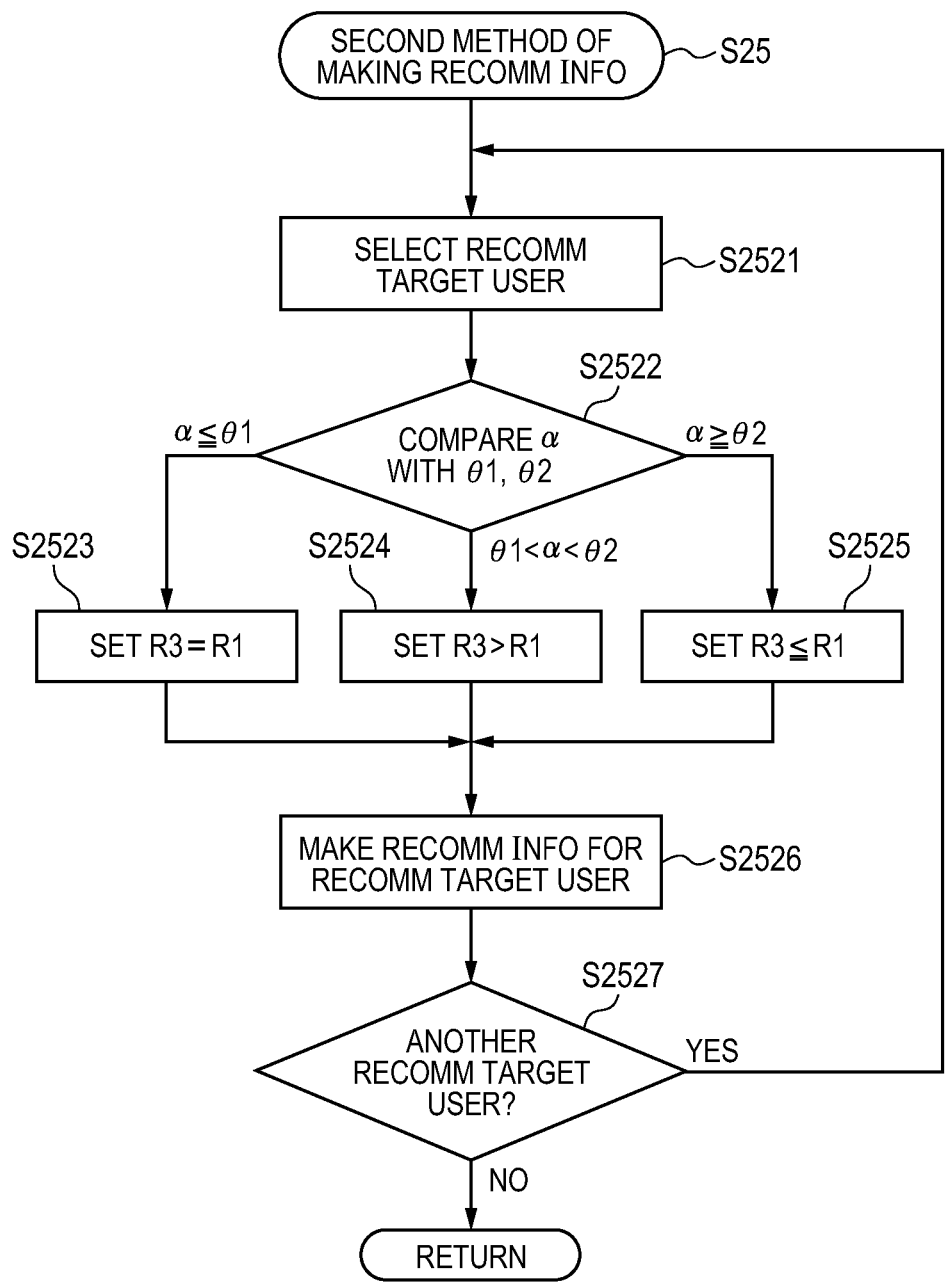
FIG. 21 is a flowchart of a second method of the recommendation information making process.

A second method of the recommendation information making process by the step S25 will be described below with reference to a flowchart in FIG. 21. A recommendation target user selecting process by a step S2521 in FIG. 21 is the same as that by the step S2511 in the first method.

In a step S2522, the user characteristic value α of the recommendation target user u and prescribed threshold values θ1 and θ2 are compared as about the decision conditions B in the step S2512 in the first method, where θ1<θ2. In the case of θ1<α<θ2, advance to a step S2524 is done. In the case of α≦θ1, advance to a step S2523 is done. In the case of α≧θ2, advance to a step S2525 is done.

In the step S2524, a process similar to the process using the conversion function shown in FIG. 20(b) in the step S2513 is performed, and thereby a third rate R3 is set as a value greater than the first rate R1.

In the step S2523, the setting is done so that R3=R1 as in the step S2514 in the first method.

In the step S2525, the third rate R3 is set to a value equal to or less than the first rate R1. This method will be described with reference to FIGS. 22(a) and 22(b).

Figure 22A:
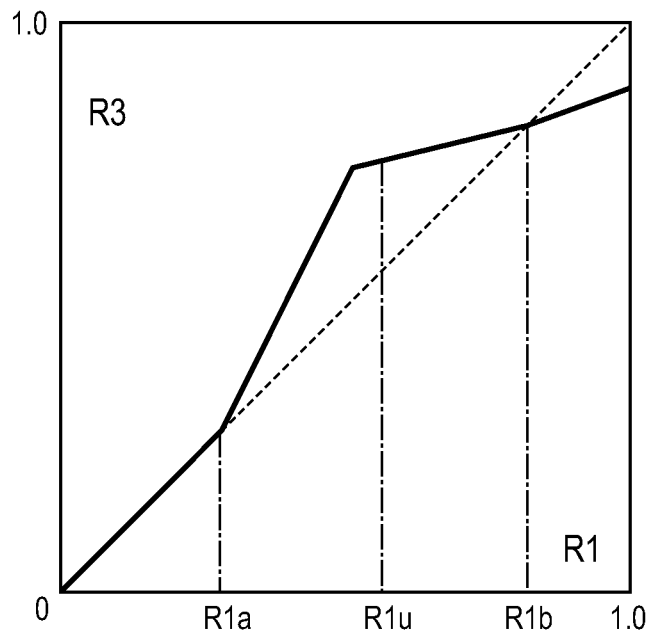
FIGS. 22(a) and 22(b) are diagrams each showing another relation between the first rate R1 and the third rate R3.

FIG. 22(a) shows a conversion function for calculating the third rate R3 on the basis of the first rate R1. The characters in the drawing are similar to those mentioned with reference to FIG. 20(b), and R1b denotes a value resulting from converting the threshold value θ2 for the user characteristic value of the recommendation target user u to the first rate R1.

When the first rate R1 is in the rage as 0≦R1≦R1a, the conversion characteristic agrees with the broken line oblique at an angle of 45 degrees so that R3=R1. When the first rate R1 is in the range as "R1a<R1<R1b", the third rate R3 is greater than the first rate R1 (R3>R1). The process in the step S2525 is performed when α≧θ2, that is, when R1b≦R1≦1. In this case, R3≦R1.

The conversion characteristic in FIG. 22(a) differs in this portion from that in FIG. 20(b), and is characterized in that R3<R1 even when R1=1. Thus, the recommendation information for any user is not occupied by items accorded with the sales policy at 100%. Therefore, the user less feels a common factor among the items in the recommendation information, and it is possible to further reduce a risk of causing the user to feel a high-pressure selling attitude of the seller.

Figure 22B:
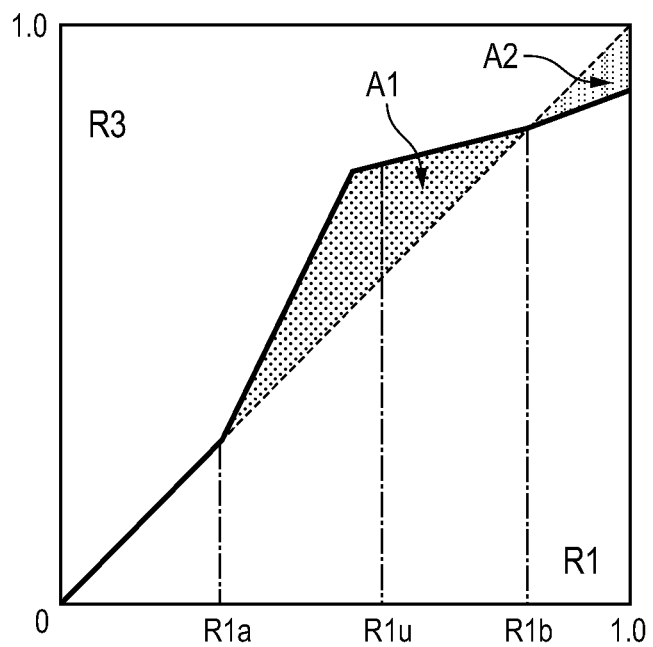

In this process, the rate in number of items accorded with the sales policy is less than that in the normal recommendation information in the first-rate range of R1b≦R1≦1. However, if the first rates R1 for many users are uniformly distributed and the area of the region below the solid line in FIG. 22(b) is greater than that of the region below the broken line oblique at an angle of 45 degrees, the average rate in number of items accorded with the sales policy in the recommendation information for many users is greater than that in the normal recommendation information. Therefore, seller's aim for recommending items accorded with the sales policy to users is achieved. In the example of FIG. 22(b), the area of the triangle A1 surrounded by the solid lines and the broken line is greater than that of the triangle A2 so that the above-mentioned conditions are satisfied and seller's aim is achieved.

Subsequent steps S2526 and S2527 are the same as the steps S2515 and S2516 in the first method.

In the prior-art system, goods (items) in the recommendation information are limited to those accorded with the sales policy so that the number of goods which can be recommended is small and sufficiency is not available depending the contents of recommendation rules set by the seller in some cases. For example, when the number of goods registered in the recommendation rules by the seller is small, there occurs the problem that the number of goods which can be recommended is small. In some cases, to recommend a sufficient number of goods, it is necessary to properly set the recommendation rules and a specialist for setting the recommendation rules is necessary so that the number of steps of setting the recommendation rules causes a burden.

On the other hand, according to the present embodiment of this invention, when the number of item IDs in the recommended item condition store section 103 is small, the first rate R1 is small. Accordingly, the third rate R3 is relatively small while the value of (1−R3) is relatively great. Since items not accorded with the sales policy are placed in the recommendation information at a rate of (1−R3), a sufficient number of items can be recommended regardless of the way of setting the recommendation rules.

According to the present embodiment of this invention, for each user, calculation is made as to a user characteristic value representing the strength of the relation between the preference of the user and the recommended item conditions (sales policy). For a user relating to a user characteristic value satisfying prescribed conditions, adjustment is properly done in the range where the rate in number of items accorded with the recommended item conditions in the recommendation information becomes less than 1. Thus, it is possible to make recommendation information which is accorded with the preference of the user and the sales policy of the seller as much as possible, and which is not biased toward the sales policy only. Therefore, it is possible to reduce a risk of causing the user to feel the recommendation information as a press by the seller, and it is possible to provide recommendation information that can easily be accepted by the user. Thus, it is possible to activate item use by the user.

In the present embodiment of this invention, there are made a first set being a set of items strongly reflecting the preference of a recommendation target user, and a second set being a set of other items. The rates of accordance with the recommended item conditions in the two sets are calculated, and the user characteristic value is calculated by using the two calculated rates. Therefore, it is possible to accurately quantify the strength of the relation between the preference of the user and the recommended item conditions (sales policy) regardless of the way of setting the recommended item conditions. Accordingly, it is possible to make recommendation information that can more easily be accepted by the user. In addition, it is possible to provide the following advantage also. At the time of changing the sale conditions, the seller does not need to ask the manager of the information selecting device 10 to change parameters such as the threshold values in the recommendation process.

What is claimed is:

1. An item selecting apparatus comprising:
a computer;
a favorite item set making section selecting, for a target user, a first prescribed number of items in order of highest preference degree or items with preference degrees equal to or greater than a first prescribed value by using use histories, and making a favorite item set being a set of items accorded with preference of the target user from the selected items;
a first rate calculating section handling a set of some or all of the items in the favorite item set or a set of items related to use by the target user in the use histories as a first set of items, and calculating, with respect to the first set of items, a first rate of the number of items satisfying recommended item conditions representing conditions for judging as items to be recommended to the number of all items in the first set;
a user characteristic value calculating section calculating a user characteristic value representing the strength of a relation between the preference of the target user and the recommended item conditions by using the first rate; and
an item selecting section selecting, from items in the favorite item set, a plurality of items including items satisfying the recommended item conditions to make a result item set;
wherein the item selecting section makes the result item set so that when the user characteristic value satisfies prescribed user characteristic value conditions, a rate of the number of items in the result item set which satisfy the recommended item conditions to the number of all items in the result item set will be greater than the first rate and smaller than 1 except for a case where the first rate is 1; and
wherein the favorite item set making section is implemented by the computer.

2. The item selecting apparatus of claim 1, wherein when the user characteristic value does not satisfy the prescribed user characteristic value conditions, the item selecting section makes the result item set so that the rate of items in the result item set which satisfy the recommended item conditions to the number of all items in the result item set will be the first rate.

3. The item selecting apparatus of claim 1, further comprising a second rate calculating section making a second set of items including items except the items in the first set, and calculating a second rate of the number of items in the second set which satisfy the recommended item conditions to the number of all items in the second set, wherein the user characteristic value calculating section calculates the user characteristic value for the target user by using the first rate and the second rate.

4. The item selecting apparatus of claim 3, wherein the second rate calculating section calculates preference degrees about respective items for a user or users except the target user by using the use histories, and selects a second prescribed number of items in order of calculated highest preference degree or selects items corresponding to calculated preference degrees equal to or greater than a second prescribed value to make the second set.

5. The item selecting apparatus of claim 3, wherein the second rate calculating section calculates preference degrees about respective items for the target user by using the use histories, and selects items in ranks later than that corresponding to the first prescribe number if the items are sorted in order of calculated highest preference degree or selects items corresponding to calculated preference degrees less than the first prescribed value, and thereby makes the second set.

6. The item selecting apparatus of claim 3, wherein the second rate calculating section selects items related to use by a user or users except the target user by using the use histories to make the second set.

7. The item selecting apparatus of claim 3, wherein the user characteristic value calculating section calculates the user characteristic value by using a value resulting from subtracting the second rate from the first rate or a value resulting from dividing the first rate by the second rate.

8. The item selecting apparatus of claim 1, wherein the item selecting section makes the result item set by using both items satisfying the recommended item conditions in the favorite item set, and items not satisfying the recommended item conditions in the favorite item set.

9. The item selecting apparatus of claim 1, wherein in cases where the user characteristic value satisfies the prescribed user characteristic value conditions, the item selecting section makes the result item set so that the rate of the number of items in the result item set which satisfy the recommended item conditions to the number of all items in the result item set will be greater than the first rate and smaller than 1 except a case where the first rate is 1, and will increase as the first rate increases.

10. The item selecting apparatus of claim 1, wherein the prescribed user characteristic value conditions are conditions that the user characteristic value is between a third prescribed value and a fourth prescribed value greater than the third prescribed value, and wherein when the user characteristic value conditions are satisfied, the item selecting section makes the result item set so that the rate of the number of items in the result item set which satisfy the recommended item conditions to the number of all items in the result item set will be greater than the first rate and smaller than 1 except a case where the first rate is 1, and wherein when the user characteristic value is greater than the fourth prescribed value, the item selecting section makes the result item set so that the rate of the number of items in the result item set which satisfy the recommended item conditions to the number of all items in the result item set will be smaller than the first rate.

11. The item selecting apparatus of claim 1, wherein a range in ranks of items in the use histories about the number of times of item use or a range in ranks of items in the use histories about the number of users who have used an item is set in the recommended item conditions.

12. The item selecting apparatus of claim 1, wherein a range in numbers of times of use of items in the use histories or a range in numbers of users who have used items in the use histories is set in the recommended item conditions.

13. The item selecting apparatus of claim 1, further comprising an output section outputting the result item set via a network.

14. In an information processing apparatus comprising a computer, a method of selecting items, comprising:
a favorite item set making step of selecting, for a target user, a first prescribed number of items in order of highest preference degree or items with preference degrees equal to or greater than a first prescribed value by using use histories, and making a favorite item set being a set of items accorded with preference of the target user from the selected items;

a first rate calculating step of handling a set of some or all of the items in the favorite item set or a set of items related to use by the target user in the use histories as a first set of items, and calculating, with respect to the first set of items, a first rate of the number of items satisfying recommended item conditions representing conditions for judging as items to be recommended to the number of all items in the first set;

a user characteristic value calculating step of calculating a user characteristic value representing the strength of a relation between the preference of the target user and the recommended item conditions by using the first rate; and an item selecting step of selecting, from items in the favorite item set, a plurality of items including items satisfying the recommended item conditions to make a result item set;

wherein the item selecting step makes the result item set so that when the user characteristic value satisfies prescribed user characteristic value conditions, a rate of the number of items in the result item set which satisfy the recommended item conditions to the number of all items in the result item set will be greater than the first rate and smaller than 1 except for a case where the first rate is 1; and wherein the favorite item set making step is implemented by the computer.

15. The method of claim 14, wherein when the user characteristic value does not satisfy the prescribed user characteristic value conditions, the item selecting step makes the result item set so that the rate of the number of items in the result item set which satisfy the recommended item conditions to the number of all items in the result item set will be the first rate.

16. The method of claim 14, further comprising a second rate calculating step of making a second set being a set of items including items except the items in the first set, the second rate calculating step calculating, with respect to the second set, a second rate of the number of items satisfying the recommended item conditions to the number of all items in the second set, wherein the user characteristic value calculating step calculates the user characteristic value for the target user by using the first rate and the second rate.

17. A computer program stored on a non-transitory computer-readable storage medium for enabling an information processing apparatus to function as:

a favorite item set making section selecting, for a target user, a first prescribed number of items in order of highest preference degree or items with preference degrees equal to or greater than a first prescribed value by using use histories, and making a favorite item set being a set of items accorded with preference of the target user from the selected items;

a first rate calculating section handling a set of some or all of the items in the favorite item set or a set of items related to use by the target user in the use histories as a first set of items, and calculating, with respect to the first set of items, a first rate of the number of items satisfying recommended item conditions representing conditions for judging as items to be recommended to the number of all items in the first set;

a user characteristic value calculating section calculating a user characteristic value representing the strength of a relation between the preference of the target user and the recommended item conditions by using the first rate; and an item selecting section selecting, from items in the favorite item set, a plurality of items including items satisfying the recommended item conditions to make a result item set;

wherein the item selecting section makes the result item set so that when the user characteristic value satisfies prescribed user characteristic value conditions, a rate of the number of items in the result item set which satisfy the recommended item conditions to the number of all items in the result item set will be greater than the first rate and smaller than 1 except for a case where the first rate is 1.

18. The computer program of claim 17, wherein when the user characteristic value does not satisfy the prescribed user characteristic value conditions, the item selecting section makes the result item set so that the rate of the number of items in the result item set which satisfy the recommended item conditions to the number of all items in the result item set will be the first rate.

19. The computer program of claim 17, enabling the information processing apparatus to further function as a second rate calculating section making a second set being a set of items including items except the items in the first set, the second rate calculating section calculating, with respect to the second set, a second rate of the number of items satisfying the recommended item conditions to the number of all items in the second set, wherein the user characteristic value calculating section calculates the user characteristic value for the target user by using the first rate and the second rate.

* * * * *